(12) United States Patent
Krause

(10) Patent No.: US 6,378,704 B1
(45) Date of Patent: Apr. 30, 2002

(54) WATER SEPARATION SYSTEM, METHOD AND APPARATUS FOR CONSTRUCTION DEBRIS

(76) Inventor: Herbert K. Krause, 6059 Guide Meridian Rd., Bellingham, WA (US) 98226

( * ) Notice: Subject to any disclaimer, the term of this patent is extended or adjusted under 35 U.S.C. 154(b) by 0 days.

(21) Appl. No.: 09/496,236

(22) Filed: Feb. 1, 2000

Related U.S. Application Data

(60) Provisional application No. 60/118,194, filed on Feb. 1, 1999.

(51) Int. Cl.[7] ............................. B03B 5/42; B03B 5/28
(52) U.S. Cl. ..................... 209/452; 209/451; 209/481; 209/482; 209/500
(58) Field of Search ........................... 209/451, 452, 209/481, 482, 500

(56) References Cited

U.S. PATENT DOCUMENTS

| | | | | |
|---|---|---|---|---|
| 384,861 A | * | 6/1888 | Melkersman | 209/173 |
| 1,041,909 A | * | 10/1912 | Trent | 209/451 |
| 1,098,497 A | * | 6/1914 | Hardinge | 209/451 |
| 1,140,962 A | * | 5/1915 | Davison | 209/452 |
| 1,917,300 A | * | 7/1933 | Hardinge | 209/452 |
| 2,047,202 A | * | 7/1936 | Hardinge et al. | 209/452 |
| 2,136,686 A | * | 11/1938 | Hardinge | 209/452 |
| 2,608,716 A | * | 9/1952 | Harris | 452/14 |
| 2,700,466 A | * | 1/1955 | Logue et al. | 209/172 |
| 3,101,312 A | * | 8/1963 | Brinkmann | 209/172 |
| 3,392,828 A | * | 7/1968 | Muller | 209/13 |
| 4,151,074 A | * | 4/1979 | Mohri | 209/44 |
| 4,252,642 A | * | 2/1981 | Mohri | 209/452 |
| 4,543,180 A | * | 9/1985 | Riker | 209/44 |
| 4,944,869 A | * | 7/1990 | Lyakov et al. | 209/173 |
| 5,110,454 A | * | 5/1992 | Parker et al. | 209/155 |
| 5,169,005 A | * | 12/1992 | Beane | 209/172.5 |
| 5,240,114 A | * | 8/1993 | Parker et al. | 209/17 |
| 5,373,946 A | * | 12/1994 | Olivier | 209/172.5 |

\* cited by examiner

*Primary Examiner*—Donald P. Walsh
*Assistant Examiner*—Daniel K Schlak
(74) *Attorney, Agent, or Firm*—Robert B. Hughes; Hughes Law Firm PLLC

(57) ABSTRACT

A system for separating construction debris into low density debris and high density debris. The construction debris is delivered into a rotating drum having front and rear discharge openings. The lower portion of the drum is filled with water, and the debris is deposited onto the water, with the low density debris floating at the surface and the high density debris descending to the bottom of the drum. A plurality of high velocity water jets are positioned forwardly of the debris receiving location to create a turbulent high velocity water flow at an upper zone of the water in the drum to move the wood and other low density material toward a rear converging passageway that leads into the rear discharge opening. The higher density material is carried by a scroll type conveyor forwardly in the drum to a forward discharge location where rotating paddles lift the high density debris upwardly and thence move it into the front discharge opening. Rear and front water separation and discharge sections are provided in the form of a fursto-conical structure having through openings to separate the water from the low density and high density debris.

68 Claims, 12 Drawing Sheets

WATER SEPARATION SYSTEM, METHOD AND APPARATUS FOR CONSTRUCTION DEBRIS

This Appln claims benefit of Prov. No. 60/118,194 filed Feb. 1, 1999.

BACKGROUND OF THE INVENTION a) Field of the Invention

The present invention relates generally to a system for the separation of lower density debris from higher density debris, and more particularly to such a system, method and apparatus which is particularly adapted to separate construction debris where the low density fraction in general has a density lower than the density of water, and the high density fraction has a density substantially greater than water. More particularly, this would be particularly adapted for use where a large percentage of the low density fraction comprises wood, and also a large portion of the high density fraction comprises rock, cement, metal and other materials commonly found in building structure or other structures.

b) Background Art

It is common practice that when a building structure is being demolished, the debris is simply gathered somewhat indiscriminately into piles and then carried to the dumpsite. Particularly in more recent years, it has been found to be more economical to simply use bulldozers, back hoes, demolition balls, explosives, etc. Depending upon the building or other structure being demolished, there may be a very high percentage of wood or other low density material, or a relatively small amount of the same.

One of the challenges regarding disposal of construction debris is how to recycle or process this material so that it could be used for some useful purpose, instead of just being accumulated in the dumpsite as waste material. Such debris, if properly sorted and/or processed, could be used for land fill, or road beds and this may be accomplished by crushing the rock or rock like material into smaller particles. However, organic material such as wood, is not desirable for a land fill. First, the organic material would decay over time and thus have its load bearing capability degraded. Second, quite often wood pieces come in sections of a two by four, etc., and when placed in a land fill these could protrude upwardly from the surface, etc.

With regard to the wood component of the construction debris, if properly separated, this could be recycled into a variety of useful products, such as ground cover, fuel, etc.

The practical problems in the existing separating processes are often too expensive relative to the economic return that might be realized by productive use of the separated and/or processed materials. The sheer mass and volume of construction debris generally makes manual separation uneconomical. Attempted separation by machinery, (e.g. back hoes and/or bull dozers) involves not only the expense of operating the machinery, but the separation process itself is difficult to be accomplished effectively.

It has been known for many decades, if not centuries, that the separation of material in accordance with its density could be achieved by flotation techniques, where the liquid medium has a specific gravity between that of the two fractions which are to be separated (i.e. where one of the fractions to be separated has a density greater than the liquid medium and the other density less than this liquid medium). Such flotation techniques have been employed in a wide variety of commercial applications.

Accordingly, it is understandable that there have been attempts to use flotation techniques to separate the low density fraction (which would generally comprise in large part wood and possibly other material having a specific gravity less than water) and the high density fraction (comprising stone, concrete, metal pieces, etc.). To the best knowledge of the applicant, the efforts to effectively accomplish such separation by flotation have only marginal success. One method is to provide an upwardly open tank which is filled with water. The construction debris is deposited into the tank, and two back hoes are operated to remove the separated fractions. One back hoe is used to skim the top of the water to remove the wood particles, while the other back hoe is used to remove the denser particles which fall to the bottom of the tank.

Another method and apparatus is disclosed in two U.S. patents (U.S. Pat. Nos. 5,240,114 and 5,110,454). In both of these patents, there is shown a system where a mixture of rock, soil particles and wood is introduced into a water tank. Near the upper water level, a plurality of jet nozzles direct streams of water through the mixture to remove the lower density particles so that these flow toward a slanted baffle 66, thence over the baffle into an area where some of the wood particles float, and some descend downwardly onto a wood piece conveyor 150. This conveyor removes the wood pieces from the water. The rocks from the mixture drop down onto a rock receiving portion 82 where there is a rock conveyor that removes these from the water tank.

A search of the patent literature has disclosed a number of other patents which relate generally to flotation/separation techniques for variety of industrial environements. These are described below.

U.S. Pat. No. 5,373,946 (Olivier) discloses a separating apparatus which utilizes what is termed a "scrolled" barrel. It is pointed out that these are classified as mono- or bi-directional. In the mono-directional barrels both of the floats and sinks move in the same direction and exit in the same end of the barrel. The bi-direction barrels have the floats and sinks move in opposite directions. It is pointed out that in the bi-directional barrel the raw feed is introduced near the place where the sinks are evacuated and the only practical way of evacuating the sinks is by means of a scrolled cone. However, there is a very annoying problem which the patent points out as up to the time of this patent never been solved in a satisfactory way, namely, how to prevent a small percentage of the floats from working their way toward the sink side of the barrel and eventually reporting with the sinks being screwed up to the sinks evacuation cone. This is solved by having the discharge end of the rotating drum formed having a fursto-conical configuration, and the larger diameter input end has a diameter greater than that of the main central barrel. Also, there is a barrier positioned at the front side of the main central portion to prevent the floats from proceeding toward the high density end. Further, the high density discharge portion has its large diameter end of a diameter greater than that of the central portion.

U.S. Pat. No. 5,169,005 (Beane) shows a separator in which material passes into a chamber that is provided with paddle drum 20. The material enters through chute 32, and the lighter material is impelled across the surface of the fluid by additional fluid supplied under pressure through nozzle 16. The lighter material passes out through chute 40. The paddles drum 20, brings up the heavy material that exits through 78.

U.S. Pat. No. 5,104,047 (Simmons) shows a waste treating system in which material entered through hopper 36, and the floating material is driven into a chopping or milling means 34, by fluid injected through jets 62. The heavier accumulates on the bottom and is removed by conveyor 70.

U.S. Pat. No. 4,944,869 (Lyakov et al.) shows a system in which a mix of crushed storage battery material is separated into constituent material by a series of flotation units as shown on sheet 5. The separator unites are formed of rotating flotation unites in which the lighter weight materials pass through, and the heavier materials separate out as them material moves through the system.

U.S. Pat. No. 3,392,828 (Muller) shows a separator in which a mix of materials enters the system via 2, and pass into a fluid fill chamber. There is a rotating mesh drum with vanes 12, operating in the fluid body. The drum is slanted relative the surface of the fluid so that at the input end the fluid is below the entrance, but at the output end the fluid flow out. Small heavy, particles 7 fall through the mesh, while large heavy bodies 9, are lifted by the vanes so as to drop on chute 10, and roll out of the separator. The light material which floats on the fluid passes out on the right below chute 10.

U.S. Pat. No. 3,101,312 (Brinkmann) shows a separator in which the materials to be separated enter through weir 4, and are carried by vanes 10 to the top of the device where the lighter material is carried out through scoop 6, while the heavy material accumulates at the body.

U.S. Pat. No. 2,700,466 (Logue et al.) shows a pair of flotation separators 26, and 27. The material to be separated enters section 26, through chute 50, and falls into fluid body 54, where the fluid carries the floating light material out through discharge chute 62. The heavy materials are raised by fins 42, and passes into section 27. In section 27, the middle weight material floats on the fluid and runs out opening 36a, to chute 89. The heaviest material is carried up through 69, where it passes out through chute 86.

U.S. Pat. No. 2,608,716 (Harris) shows in FIG. 3, a device that separates oyster meat from shell fragments. The meat with shell material are carried by belt 31, to the flotation bath where the meat floats and is propelled by fluids from nozzles 43, toward belt 36. The small fragments fall to belt 44, and are carried off.

U.S. Pat. No. 384,861 (Melkersman) shows a device that separates good grain from bad, as well as other light materials. The materials to be separated enter through "I", and fall into the water. The heavy material moves down to the large end of the rotating cylinder and is lifted by buckets "G", to fall onto screen "H". the light material floats out over the lip of the cylinder into screen "H".

Accordingly it is an object of the present invention to provide a separation system, method and apparatus which is particularly adapted to effectively accomplish the separation of debris into lower and higher density fractions. More particularly, the present invention is particularly adapted to solve the various challenges that are involved in the separation of construction debris, where there is a desirable balance of advantages, such as accomplishing the process efficiently, at reasonable cost, with high production, and reliably.

SUMMARY OF THE INVENTION

In the method of the present invention, there is provided a rotatably mounted drum which comprises a surrounding side wall and front and rear end walls having, respectively, front and rear discharge openings. The drum defines a processing chamber with a lower water containing chamber region, having an upper level at an upper water level in the region and a lower level at a lower side wall portion at the region. At least part of the water containing chamber region is positioned at a level below lower portions of the front and rear openings. The drum has a high density debris conveying structure which is arranged to engage high density debris at a lower part of the water containing chamber region. The water containing chamber region is filled with water to form a body of debris processing water in the chamber region.

Then the debris is delivered into the processing chamber at a receiving location at the water containing chamber region.

Additional water is delivered into the processing chamber at a water discharge location forward of the debris receiving location. This additional water is delivered at a location adjacent to the upper level of the water containing region in a rearward direction generally aligned with the upper level of body of water at a sufficiently high velocity into an upper high velocity low density separating zone. This causes the low density debris in that zone to move from the debris receiving location rearwardly to be discharged at the rear discharge opening. The high density debris that is delivered to the receiving location descends through the upper high velocity low density separation zone toward the lower level of the water containing region.

The drum is rotated to cause the conveying structure to move the high density debris at the lower part of the water containing chamber region to a forward end of the drum. Then the high density debris is discharged through the front opening.

In a preferred form, there is a water discharge region at the water discharge location extending across the upper level of the water containing chamber region. The method further comprises discharging the additional water only at a portion of the water discharge region so that the additional water creates with the surrounding water a turbulent downstream flow. Desirably, this is accomplished by discharging the water through a plurality of nozzles to form a plurality of water jets. These nozzles are positioned in the preferred form on both sides of a center location of the water discharge region. As a further region, there is at least one discharge nozzle at a location beneath the water discharge region to direct a flow of water in a rearward direction.

The preferred configuration of the nozzles is that each nozzle has an elongate nozzle opening with a width dimension greater than its depth dimension, and with an elongate axis of each of said discharge openings being generally horizontally aligned. This results in high velocity flow patterns which expand laterally at a greater rate than vertical expansion.

In the preferred form, the water is discharged through the nozzles at a velocity of at least one foot per second, more desirably at least four feet per second, and also desirably at a velocity of at least ten feet per second. In a preferred embodiment the range is between ten to fifteen feet per second. It is to be understood that the velocity within the broader scope could be at 2, 3, 5, 7, 8, and 9 feet per second. Further the velocity could be increased by one flow per second increments up to fifteen feet per second which would be a preferred velocity, and through one foot per second velocity increments up to 20 or 25 feet per second. Desirably, the rear discharge opening is defined by a generally circular perimeter rim and is generally centered on an axis of rotation of the drum. The water flowing out of the rear opening is over a curved rim segment, and the water is delivered at a sufficient flow rate so that the curved segment over which the water flows is at least thirty degrees. At a higher velocity, the segment over which the water flows is at least forty five degrees, and with yet higher velocity at least sixty degrees.

Desirably, the low density debris is moved by the water flow from the debris receiving location into a predischarge zone section which is defined by an inwardly and upwardly tapering rear end wall leading to the rear discharge opening and through which the water accelerates to be discharged through the rear discharge opening. Desirably the rear edge portion of the rear end wall is aligned with the circular perimeter rim of the opening. This rear end wall is desirably configured approximately in a fursto-conical configuration.

The water and load density debris are discharged from the rear opening onto a low density debris receiving discharge structure having flow through openings through which the water falls to separate the low density debris from the water. Desirably, this low density debris receiving discharge structure comprises a surrounding fursto-conical side wall member with a smaller inlet opening and a larger outlet opening. This low density debris receiving discharge structure is rotated to tumble the low density debris to facilitate discharge of the same. Desirably this discharge structure is connected to the drum so as to be rotatable therewith.

Water and high density debris are discharged from the rear opening onto a high density debris receiving discharge structure having flow through openings through which the water falls to separate the high density debris from the water. This high density debris receiving discharge structure comprises a surrounding a fursto-conical side wall member with a smaller inlet opening and a larger outlet opening which is rotated to tumble a low density debris to facilitate discharge of the same, and which is desirably connected to the drums so as to be rotatable therewith.

The high density debris is discharge by rotating a discharge structure to engage the high density debris at the forward end of the drum and carry such high density debris to be discharged through the front discharge opening. Desirably the discharge structure is mounted to the drum so as to be caused to rotate by rotation of the drum. Further, in the preferred form, the discharge structure comprises a plurality of paddles which are circumferentially spaced and which engage the high density debris at a lower location to carry it to a higher location and cause discharge of the high density debris through the front discharge opening.

The high density conveying structure is positioned at an inside surface of the drum and extends radially inwardly therefrom with a rearward to forward slanting surface portion which engages the high density debris to cause forward movement of the high density debris.

The apparatus of the present invention has in large part been described in the above text relating to the method of the present invention. Thus, as indicated above, the apparatus comprises a rotatably mounted drum having the surrounding side walls, the front and rear end walls with the front and rear discharge openings, and also the high density conveying structure. There is support and drive section to support and rotate the drum.

There is a debris delivering section to deliver the debris into the processing chamber at a receiving location at the water containing chamber region. In a preferred form, this debris delivering section comprises a conveyor extending through one of the front and rear openings in the drum (desirably extending through the rear opening), and a hopper delivering the debris onto the rear end of the conveyor which then carries it inwardly above the water level in the processing chamber to deposit the debris off the front of the conveyor and onto the surface of the water at the receiving location.

There is also a water supply and delivery section which discharges water through the aforementioned nozzles (in the preferred form). In the overall system, there is a pair of settling tanks, and water is drawn from the settling tanks by a pump which in turn directs the water through a control valve and thence through a conduit section that extends through one of the front and rear openings in the drum. The conduits are desirably supported from the conveyor. The conduits extend outwardly to the water level and then terminate in rearwardly directed water nozzles.

Most all of the processing water is discharged through the rear opening along with the low density debris. The water discharged from both the rear and the front opening is collected in a tank positioned beneath the drum, and it is directed from this tank to the settling tanks where sludge and small particles settle out.

Other features and components of the present invention are described in the prior text under "Summary of the Invention" and also are described in more detail in the full text that follows.

DESCRIPTION OF THE PREFERRED EMBODIMENT a) Overall Description of the System 10

Figure 1:
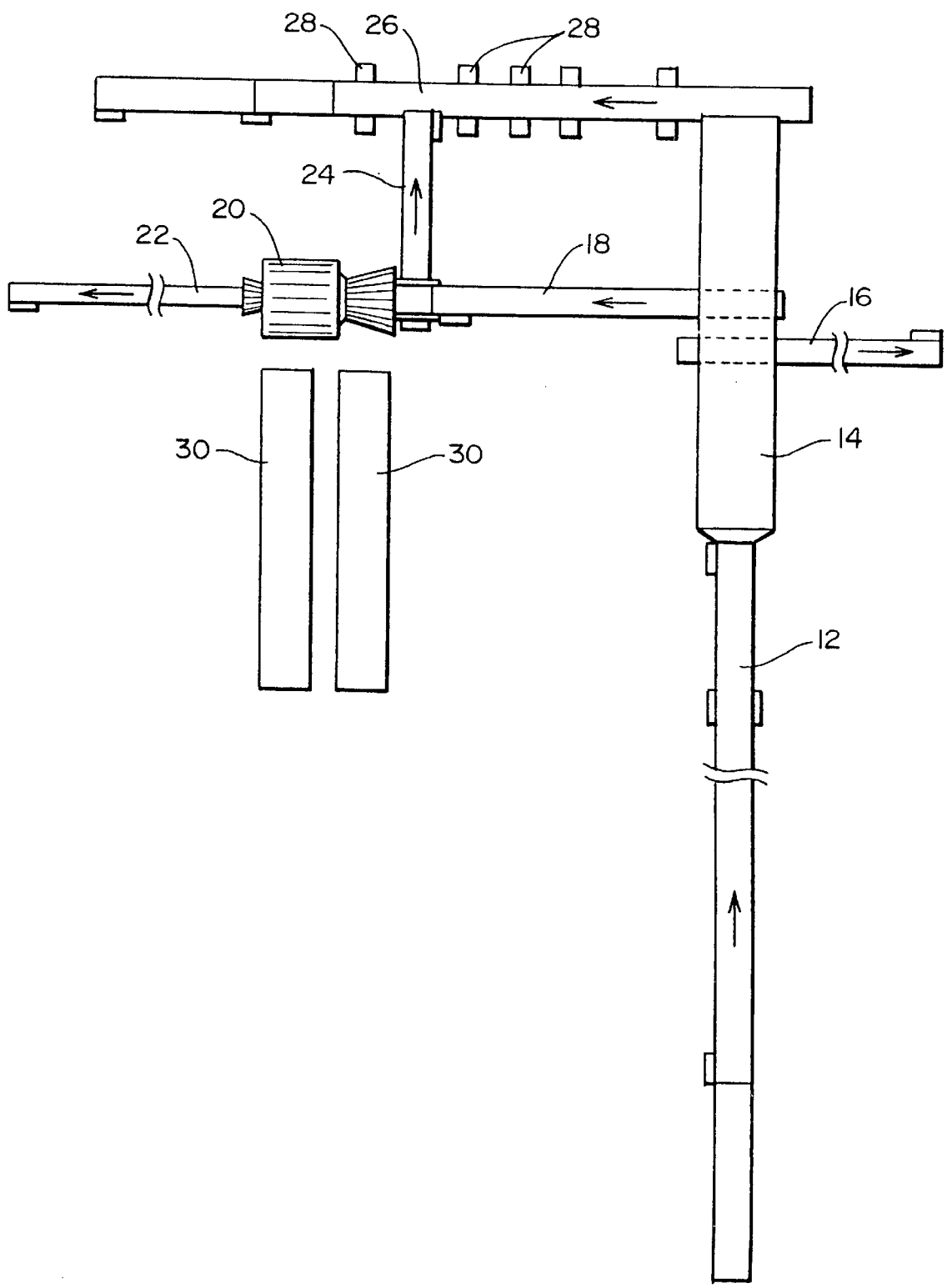
FIG. 1 is a schematic top plan view of the overall system of the present invention.

With reference to FIG. 1, the overall system 10 of the present invention is illustrated somewhat schematically in top plan view. There is an initial conveyor section 12 on which the construction debris to be sorted is placed, and this conveyor 12 delivers the construction debris into a rotating trommel 14 which is or may be of conventional design. This initial conveyor 12 can be made up of one or more conveyor sections, with the first conveyor receiving the construction debris and delivering it onto a second conveyor in a manner so that the material can be spread out more evenly. Some initial sorting may be done (e.g. by hand) on this first conveyor to remove objects that desirably should not proceed through the system.

The trommel 14 is arranged so that in the first infeed section of the trommel, there are small openings through which the dirt and small gravel falls to be collected and delivered to a collecting location. This function is accomplished by a conveyor 16 which receives this dirt and small gravel and takes it to a collecting location.

The downstream portion of the trommel 14 has around its side larger openings in its surrounding sidewall, possibly one foot in diameter, where the medium sized material which is to go through the separation process passes through the openings in the trommel 14, to be delivered onto a feed conveyor 18 which in turn carries this larger material to the separating assembly 20 of the present invention.

This separating assembly 20 is the more significant part of the overall system 10 and will be described in greater detail later herein. This separating assembly 20 very effectively separates the construction debris into a more dense fraction or component which is made up of rock, metallic pieces, etc., and a lower density fraction or component, which comprises wood and other material of lower density. The higher density fraction is carried from the separation assembly 20 by a high density debris conveyor 22 to a collecting location, while the lower density fraction or component of the construction debris is carried away by a low density component conveyor 24.

Then there is a final disposal conveyor 26 which receives material at two locations. First at a rear location, the larger size construction debris that does not pass through the openings in the trommel 14 is delivered onto the rear end of the final conveyor 26. Also, the low density component conveyor 24 delivers the low density material (wood or other low density material) onto this same conveyor 26. The material delivered to this conveyor 26 can be disposed of in various ways. For example, there can be various sorting locations 28 along the length of the conveyor 26 to remove certain portions of the debris, such as, for example, wood pieces. Then the remaining debris is delivered to an end location. This may comprise larger rocks or objects which can be disposed of in various ways, such as being crushed and used for roadways or landfill, etc. The wood fraction can be recycled in various ways.

Finally, there is a pair of large settling tanks 30. As will be disclosed subsequently in the more detailed description herein, water is delivered through the separating assembly 20 at very high volumetric rates (e.g. as high as 2000 or 2500 gallons per minute). Thus these two tanks 30 are relatively large (e.g. each in a preferred design, each being as large as fifty feet long by eight feet) and the water used in the separating assembly 20 is cycled through the settling tanks 30 to let dirt and other material settle out. The water is continuously directed from the tanks 30 back to the separation assembly 20.

In a full commercial operation, the overall length dimension of the initial conveyor 12 plus the trommel 14 could be as long as approximately 200 feet, and the final conveyor 26 could be as long as 100 feet. In the arrangement of the present invention, depending upon the type of construction debris that is being processed, the overall capacity of the whole system could be as much as 60 to 200 tons of debris in an hour, and the portion of the construction debris that is passed through the separating assembly 20 could be as great as 30 to 100 tons per hour.

b) Overall Description of the Separating Assembly 20

Figure 2:
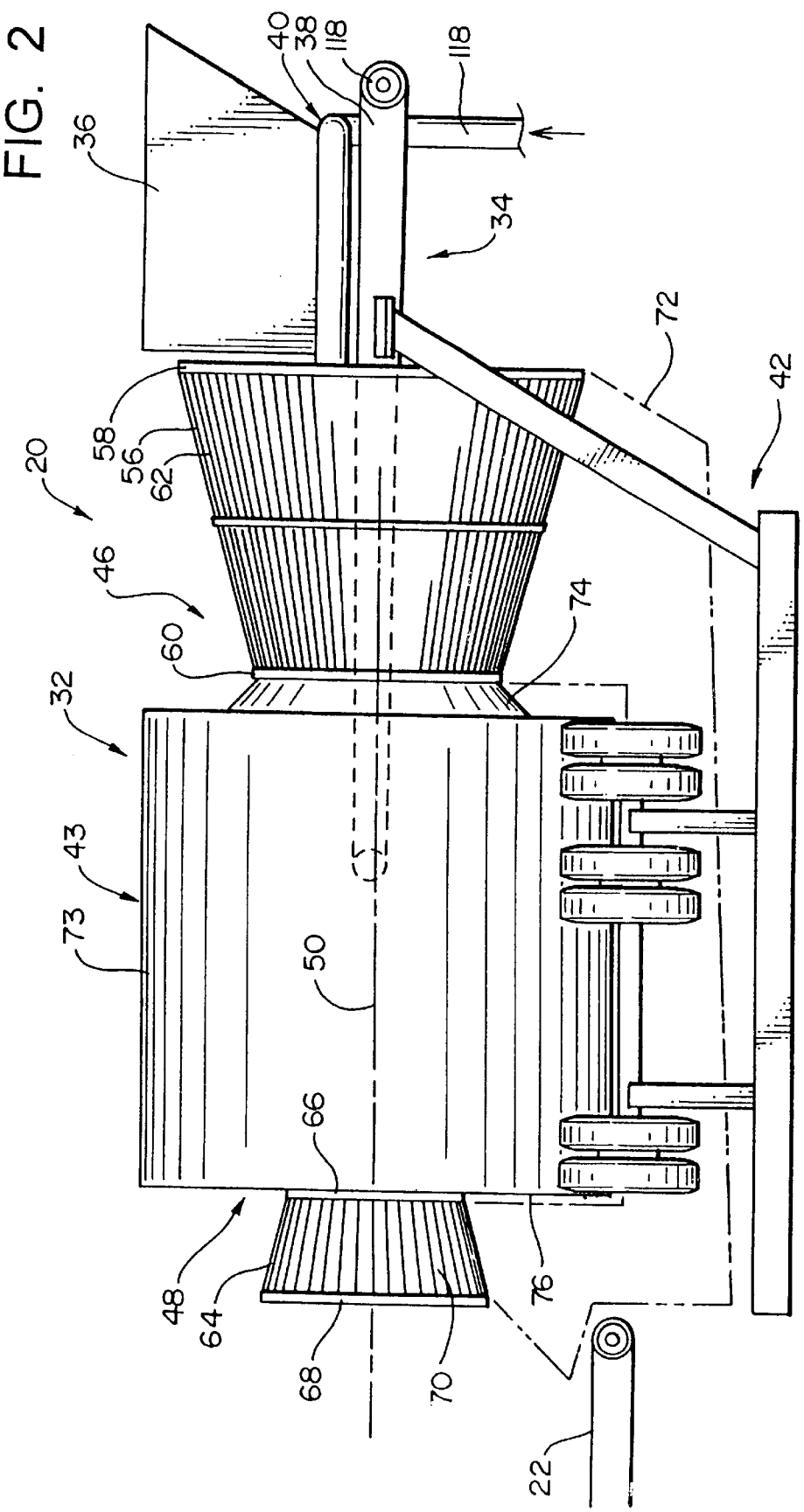
FIG. 2 is a side elevational view of the separating assembly of the present invention.
Figure 3:
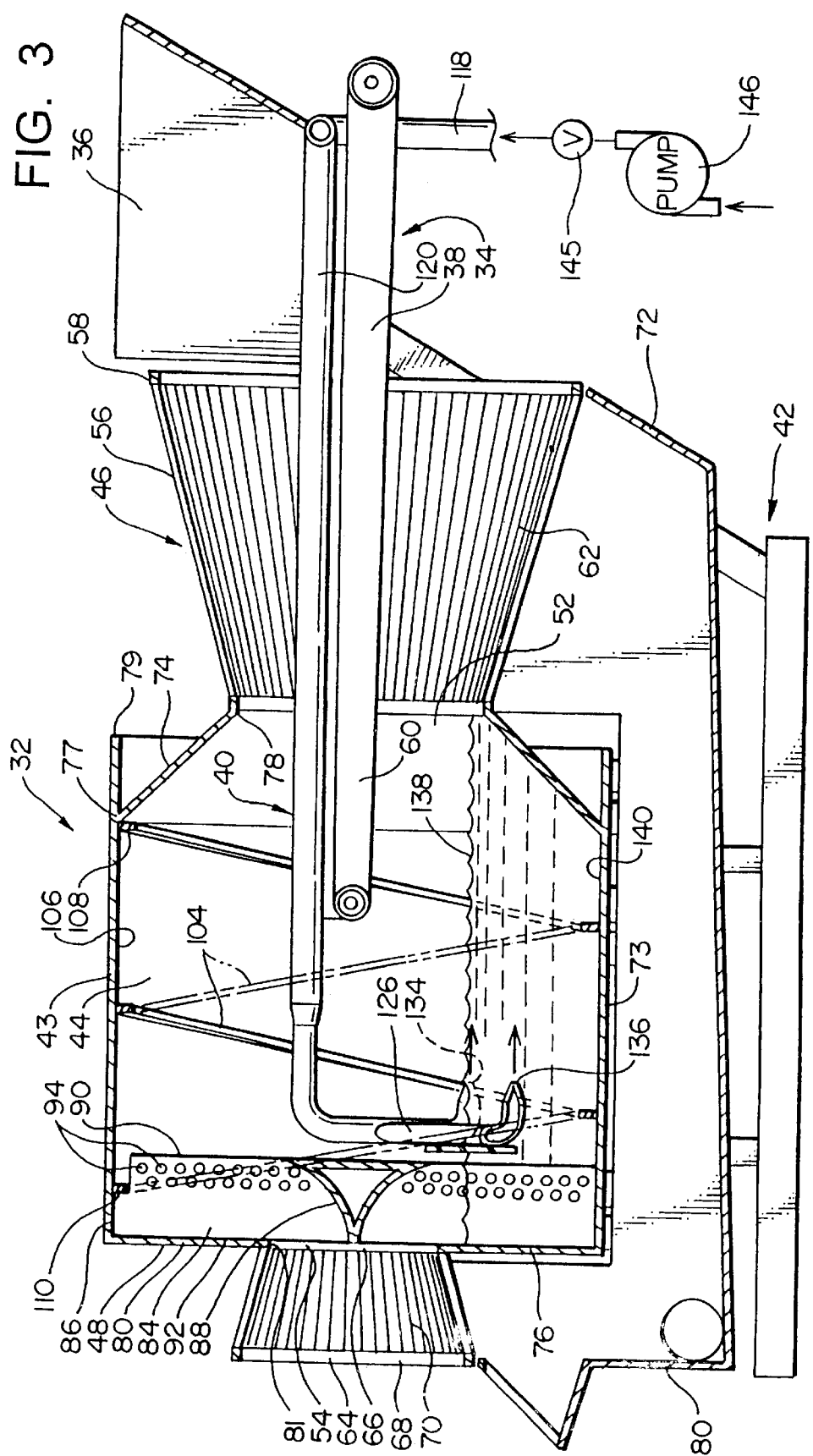
FIG. 3 is a cross sectional view, taken along a vertically aligned longitudinal plane through the longitudinal center axis of the separating assembly.
Figure 4:
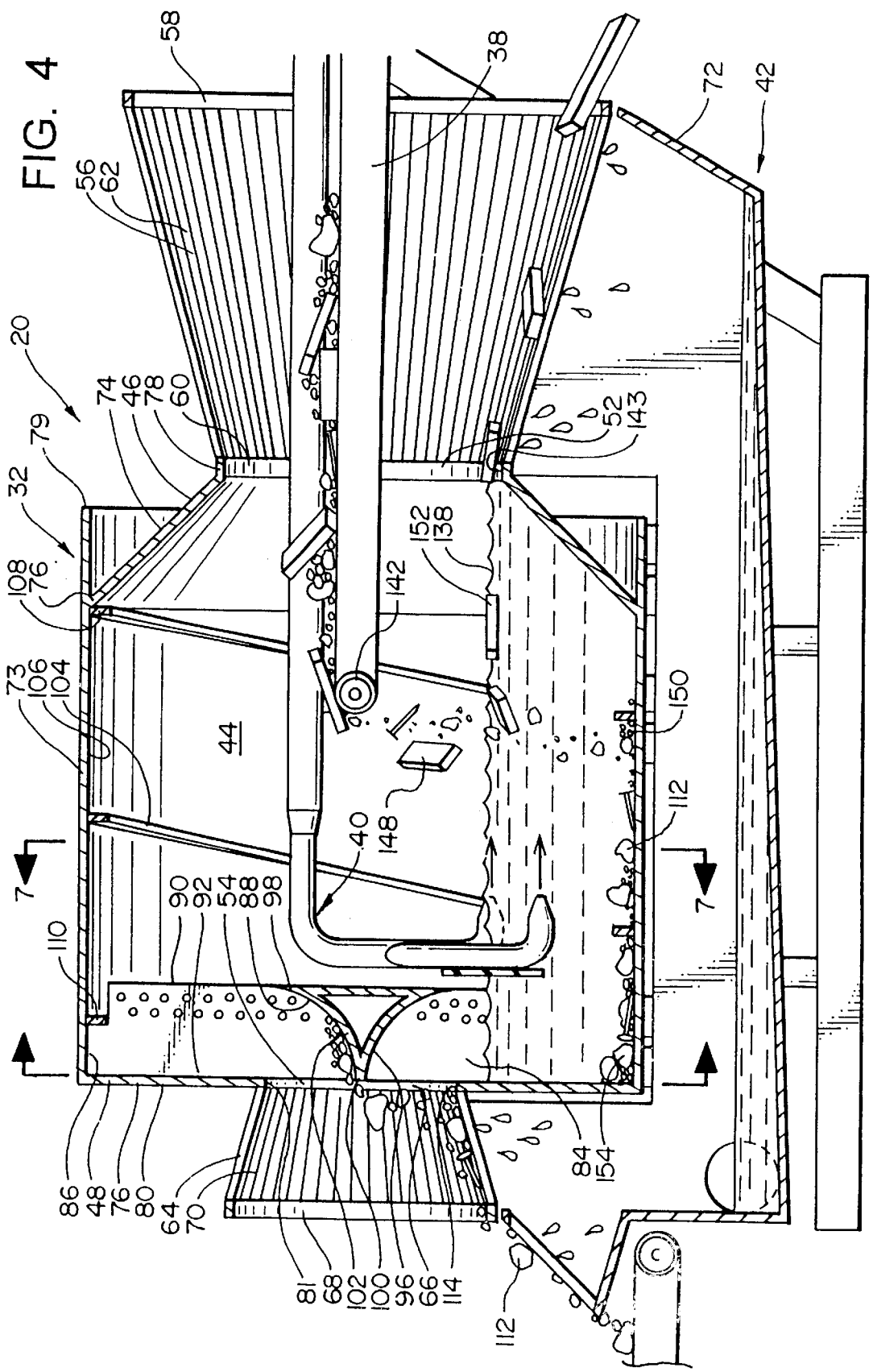
FIG. 4 is a sectional view similar to FIG. 3, illustrating the separating assembly in operation.

Reference is initially made to FIGS. 2,3 and 4. This separating assembly 20 comprises:

i) a separating section 32 which is a unitary structure where the separating process takes place and from which the high density and low fractions are delivered to their respective conveyors 22 and 24;

ii) a construction debris feed section 34 which comprises a hopper 36 which receives construction debris from the conveyor 18, and a conveyor 38 which receives the debris from the hopper 36 and delivers the debris to the interior of the separating section 32;

iii) a water supply and discharge section 40 which continuously delivers water at a large volumetric flow rate into the separating section 32 which cooperates with the other components in the separating process to move the low density fraction or component to be discharged from the separating section 32, and recycles the water through the settling tanks 30 (These settling tanks 30 can be considered part of the water supply and discharge section 40);

iv) the support and drive section 41 that (as its name implies) provides support for the separating section 32, rotates the separating section 32.

The separating section 32 is, as indicated above, a rotably mounted unitary structure. This section 32 comprises a separating and conveying drum 43 which has a generally cylindrical configuration and defines a processing chamber 44. This separating section 32 has a rear end portion 46, a front end portion 48 and a longitudinal center axis 50 about which the separating section 32 rotates. The drum 43 has a generally circular rear end opening 52 through which the low density debris and the major part of the processing water is discharged, and a front opening 54 through which the higher density debris fraction is discharged, with both openings 52 and 54 being centered on the longitudinal center axis 50.

At the rear end 46 there is a low density discharge structure 56 which has a general frusto-conical configuration and comprises a rear circular perimeter edge 58 of a larger diameter, and a front circular perimeter edge 60 of a smaller diameter at the opening 52. There is a plurality of elongate bars 62 which are fixedly connected between the perimeter edge portion 60 and 58 in a rearwardly expanding fursto-conical configuration. These bars 62 are spaced from one another to form elongate slots of about ⅜ to ¾ inches to permit the water from the rear opening 52 to pass therethrough.

There is a front high density discharge structure 64 positioned at the front end 48 of the separating section 32, and this also has a generally fursto-conical configuration, with a rear circular perimeter edge portion 66 at the front opening 54 and a forward circular perimeter edge portion 68 having a larger diameter than the perimeter edge portion 66. Also, there is a plurality of bars 70 extending between the two perimeter edge portion 66 and 68 in an expanding fursto-conical pattern, spaced from one another by about ⅜ to ¾ inches. These discharge structures 56 and 64 are significant in the present invention (particularly the rear structure 56) in that these separate the low and high density debris components from the water and enable the water to be recirculated. As part of the water supply section 42, there is a water recovery tank 72 to receive the major part of the water that passes through the rear discharge structure 62 and also the smaller amount of water that passes through the forward discharge structure 64.

The aforementioned separating and conveying drum 43 comprises a cylindrical side wall 73, a rear end wall 74 which has an overall fursto-conical configuration which converges in a rearward direction at an angle that is about 45 degrees from the longitudinal axis 50, comprising a front edge portion 76 of a larger diameter and a rear edge portion 78 of a smaller diameter and which defines the rear opening 52. The wall 74 itself is solid and extends between its two perimeter edge portions 76 and 78. The perimeter edge portion 76 is fixedly connected to the cylindrical side wall 73 a moderate distance forwardly of the rear edge 79 of the side wall 73. The rear perimeter edge 78 is coincident with the front edge portion 60 of the rear discharge structure 56.

The drum 43 has a front wall 80 which has a planar configuration aligned transversely to the longitudinal axis 50, and the aforementioned discharge opening 54 is defined by a perimeter circular edge 81 in the front wall 80. Immediately behind the front wall 80 is a high density debris collecting structure 82 which comprises four planar longitudinally aligned planar paddles 84 which extend radially outwardly, at right angles from each other, from the center axis 50. Each paddle 84 has an outer edge 86 fixedly attached to the forward part of the cylindrical side wall 74, an inner edge 88, a rear edge 90, and a front edge 92 fixedly connected to the front wall 80. Each paddle 84 has a plurality of through openings 94 along the rear portion thereof to permit the passage of water therethrough.

At the center of the collecting structure 82 there is a discharge cone 96 having a rear circular edge 98, a front point 100, and a side wall 102 having a generally furstoconical shape, which is concavely curved relative to reference coincident with the longitudinal axis 50. Thus, the wall 102, as seen in cross section in FIG. 4, has a concave curve which helps direct the high density debris components into the front discharge structure 64. The arrangement of this discharge structure can best be seen in the sectional views shown in FIGS. 8 and 9.

The separating and conveying drum 43 also comprises a conveying structure 104 positioned within, and fixedly connected to, the interior surface 106 of the drum side wall 73. In the particular configuration shown herein, this conveying structure 104 is an elongate planar member having a spiral configuration, so that rotation of the drum 43 in the appropriate direction causes the conveying structure 104 to move the higher density material which collects at the bottom of the drum sidewall 73 forwardly in the drum chamber 44. Such conveyors are sometimes referred to as "scroll conveyors", and these can have various configurations, such as having a continuous helical member, two or more continuous helical members with the flights spaced longitudinally from one another, or a possibly conveying section which is not formed in a continuous elongate spiral member, but in spiral segments. In this particular configuration, the conveying structure 104 is formed as one continuous spiral that makes two complete revolutions, and has a rear starting end location 108 adjacent to the front edge 76 of the rear wall 74 and a front end location at 110 adjacent to the collecting structure 82.

Figure 8:
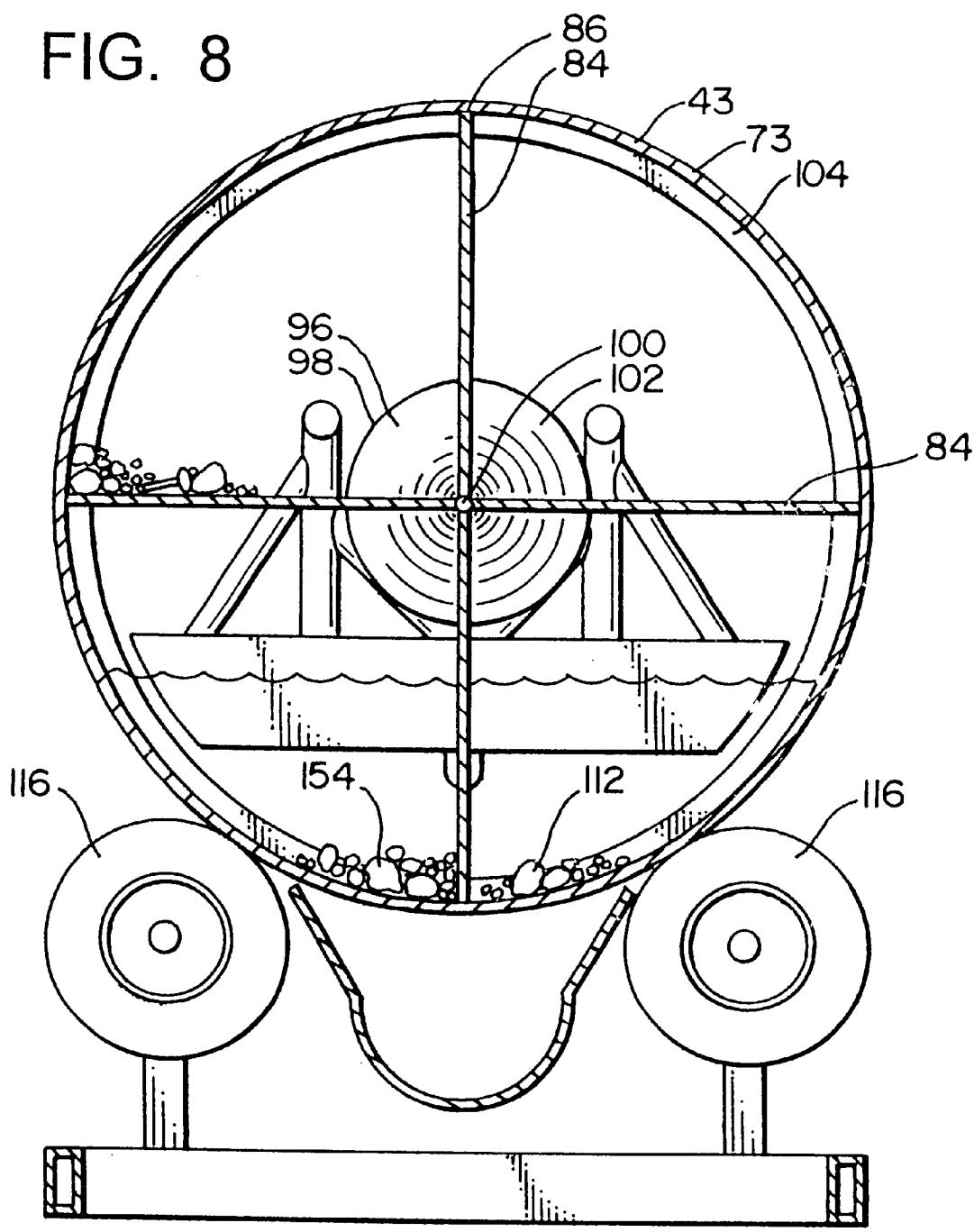
FIG. 8 is a sectional view taken along line 8—8 of FIG. 4.
Figure 9:
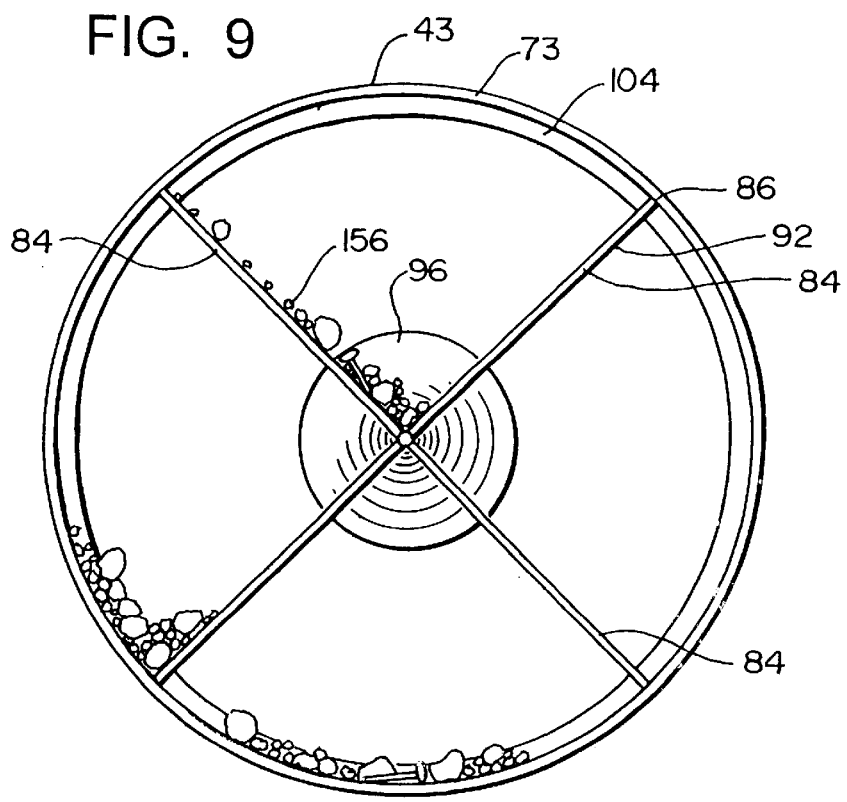
FIG. 9 is a view taken along the same section line as FIG. 8, but showing only the outer drum and the front discharge section of the present invention.

It can readily be see from examining FIGS. 4, 8 and 9 that as the high density debris 112 collects in the bottom of the drum 43, the rotation of the drum 43 causes the conveying structure 104 to move the high density debris 112 to a forward location where it is engaged by the paddles 84 to be carried upwardly (see FIG. 8), with further rotation of the drum moving the paddles 84 further upwardly and causing the debris 112 (see FIG. 9) to tumble down the surface of the paddle 84 toward the center cone 96 to cause the high density debris 112 to be discharged in a forward direction into the front discharge structure 64.

The aforementioned support and drive section 42 comprises a base frame 114 which provides support for the water receiving tank 72, and also for the rotating separating section 32. More specifically, this support and drive section 42 comprises a plurality of circular drive members 116 which can conveniently be provided in the form of rubber automobile or truck tires 116, one or more of which is driven by a suitable motor (electric powered, diesel powered, etc.). It can be seen (and as is evident from the foregoing description) that the separating section 32 is a unitary structure which comprises basically the separating and conveying drum 43 and the discharge structures 56 and 64 rotate as a single unit.

Figure 5:
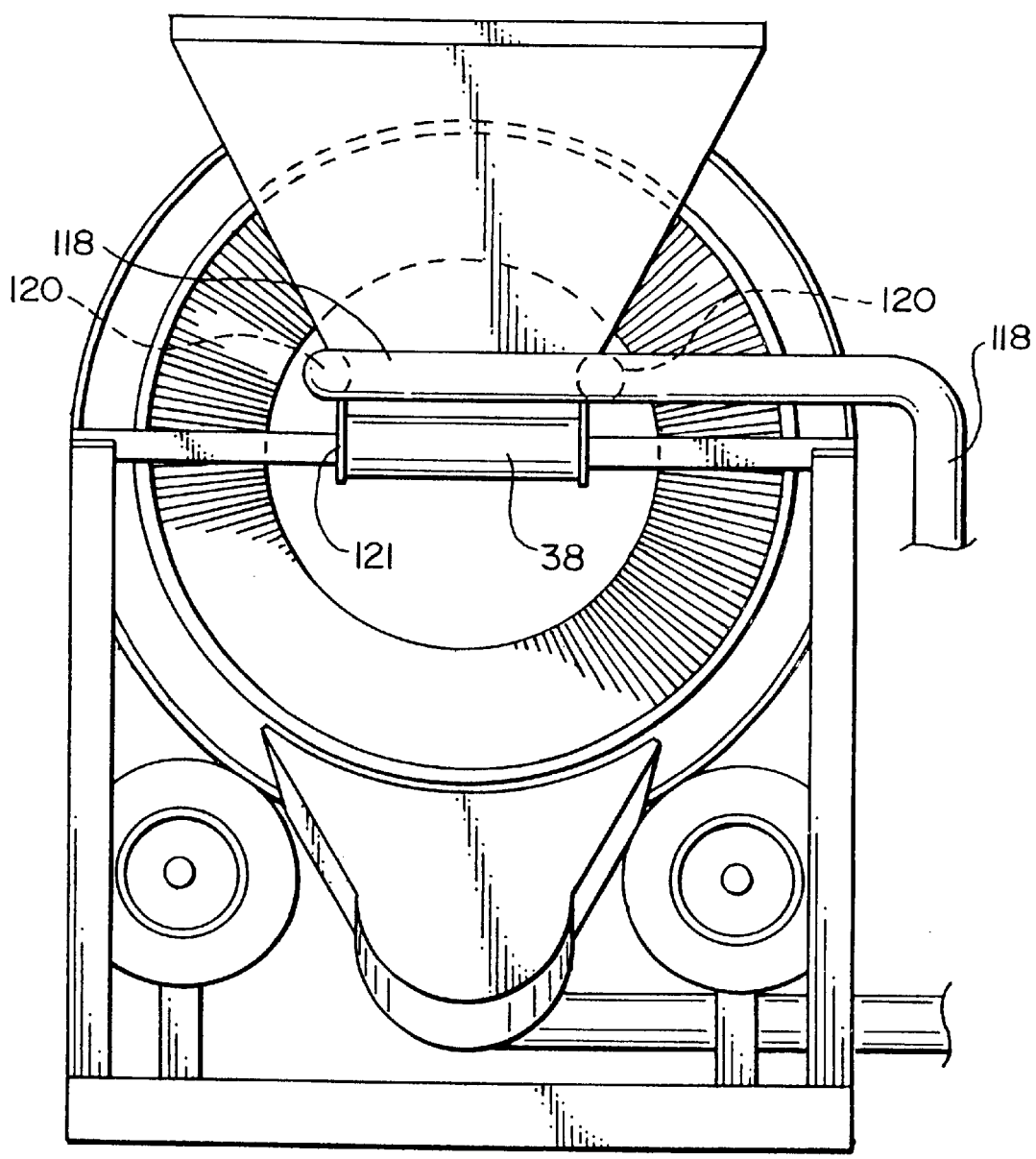
FIG. 5 is a rear elevational view thereof.
Figure 6:
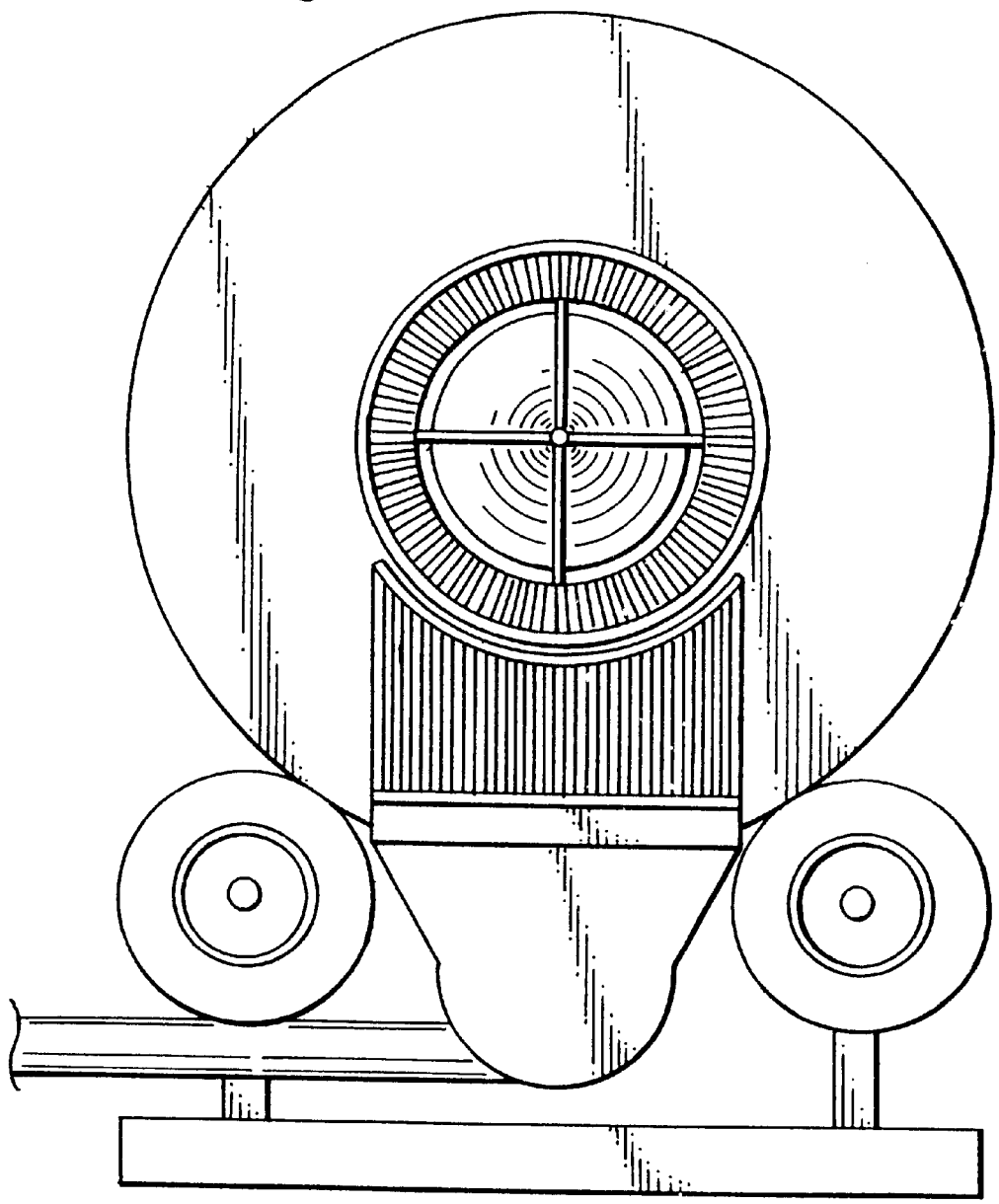
FIG. 6 is a front elevational view thereof.

The water supply and discharge system 40 will now be described with reference being initially made to FIGS. 2 and 5. As indicated previously in the overall description of the system 10, and with reference to FIG. 1, there are provided two relatively large settling tanks 30 for the relatively large amount of water which is used in the operation of the separating section 32. There is a main feed line 118 which directs water from either or both of the tanks 30 to the location of the separating section 32. This line 118 (see FIG. 5) feeds into two longitudinally extending supply lines 120, which are supported from the structure 121 of the aforementioned conveyor 38. These two supply lines 120 extend longitudinally in a forward direction to reach through the rear main opening 52 and extend all the way to a location just in front of the saddles 84 of the discharge structure 82.

Figure 7:
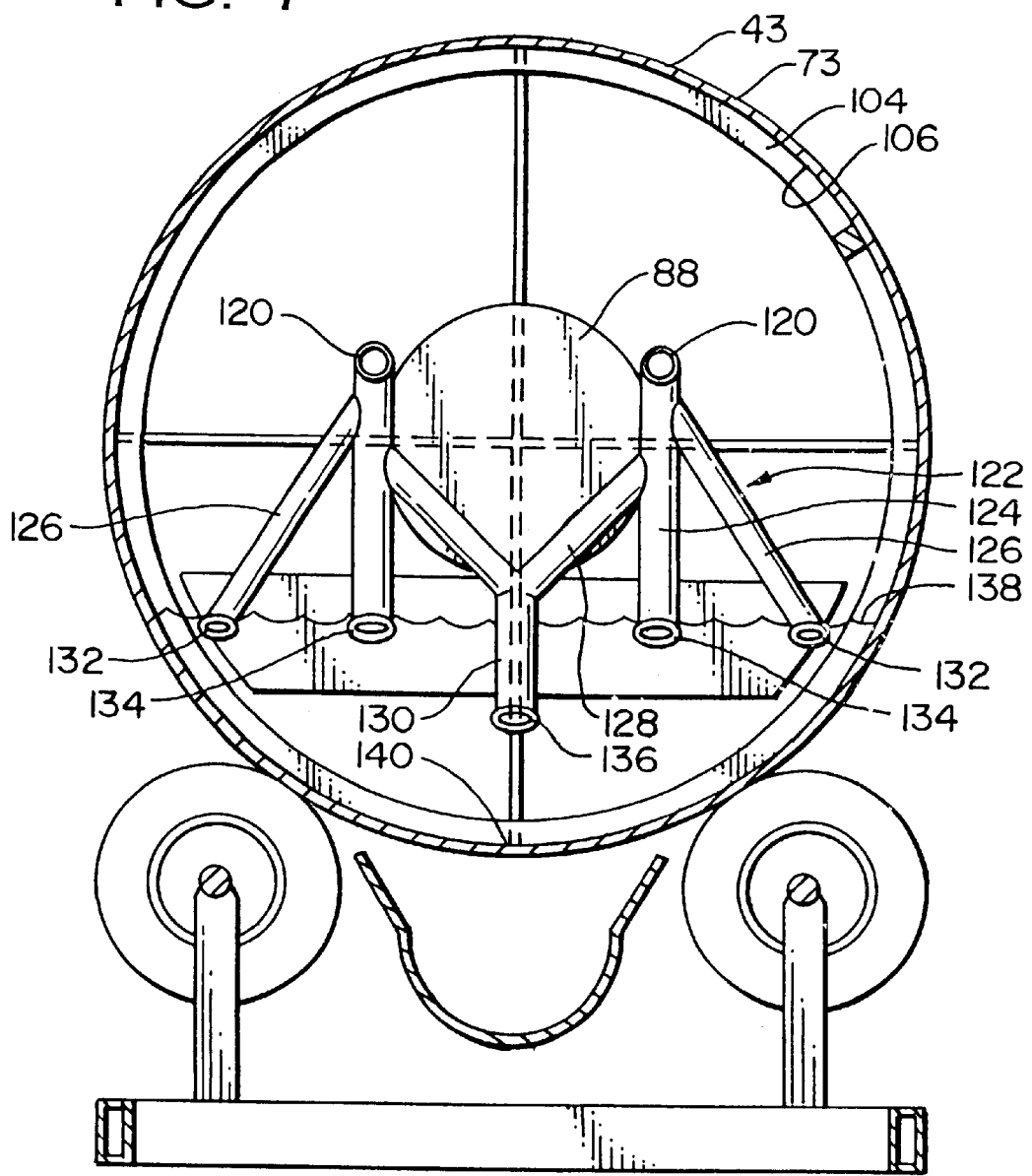
FIG. 7 is a transverse sectional view taken along line 7—7 of FIG. 4.

These two supply lines in turn lead to a manifold section 122 (see FIG. 7). This manifold section 122 comprises two vertically oriented conduit sections 124 which are downward extensions of the aforementioned supply lines 120. At an upper location of each of the lines 124 there is a downwardly and laterally outward extending line 126, and also there are two additional lines 128 which extend downwardly and in a slant toward a central location to join to a lower central tube section 130. The two lines 124 both continue downwardly to terminate at a lower location.

With further reference to FIG. 7, it can be seen that the two outer tubes 126 terminate at the lower end in rearwardly directed outer nozzles 132 which are positioned near to the inner edge portion of the conveyor 104. Then the two tube portions 124 terminate in inner nozzles 134 which also face rearwardly and are each positioned about midway between its related nozzle 132 and the longitudinal center axis 50. Then the middle tube 130 terminates at its lower end in a rearwardly facing discharge nozzle 136 which is centrally located. It will be noted that he four nozzles 132 and 134 are located at a level of the water which is indicated at 138. The central nozzle 136 is at a lower location which is about midway between the water level shown at 138 and a lowermost location 140 of the inner surface 106 of the drum sidewall.

c) General Description of the Overall Operation

In this section the overall operation will be given in more general terms to explain the functions of the main components. Then in the section that follows, there will be described in more detail certain distinctive features of the present invention relating to the sorting and discharge of the low density fraction of the construction debris and the water.

Reference will first be made back to FIG. 1, where there is shown the conveyor 12 carrying the construction debris to the trommel 14 with the dirt and small particles being separated out and deposited on the conveyor 16, the very large objects passing through to the discharge end of the trommel 14 and being deposited on the end conveyor 26, and various objects of an intermediate size being deposited upon the conveyor 18 which in turn leads to the separation assembly 20. This material from the conveyor 18 is delivered to the hopper 36 (see FIG. 2) to be deposited upon the rear end of the conveyor 38 which carries the construction debris in a forward direction through the rear opening 52 in the separating section 32. The front discharge end 142 of the conveyor 38 is located a moderate distance forwardly from a longitudinally center location in the drum 43.

In FIG. 4, the construction debris is represented as smaller and larger rocks, some metal objects, pieces of wood, etc. Before the separating process beings, the drum 43 is filled with water up to the level shown at 138 in FIGS. 3, 4 and 7. It will be noted that this level 138 is indicated as being at (or at most just slightly higher than) the level of the lowermost location 143 of the rear perimeter edge 78 of the rear end wall that defines the opening 52. Thus a small amount of the water is shown flowing outwardly through the opening 52. It will also be noted that the diameter of the front end opening 54 is smaller than the diameter of the rear opening 52 so that the lower edge 144 of the opening 54 is above the lowermost edge portion 143 of the rear opening 52.

When the separating operation beings, and the construction debris is just started to be loaded into the hopper 36 and onto the conveyor 38, and with the drum 43 being filled with water up to the level indicated at 138 or slightly, the valve 145 controlling the flow into the main supply line 118 is moved to an open position, and the pump 146 is energized to start pumping the water into the system at a sufficiently high volumetric rate. At the same time, the motor which rotates the separating section 32 is energized to cause the entire separating section 32 to being rotating in a direction to cause a forward conveying structure 104 (in a front view, taken from the left of FIGS. 2, 3 and 4 this direction of rotation would be clockwise).

As the construction debris 112 drops off the discharge end 142 of the conveyor 38 as indicated at 148, the higher density material (generally rock, metal pieces, etc.) drop to the lower part of the drum 73, as indicated at 150. The material of lower density (e.g. wood) indicated at 152 floats on the water surface. The debris at 150 is moved by the conveying structure 104 forwardly to the location indicated at 154 in FIG. 4 and also in FIG. 8. With the section 32 moving in a clockwise direction (as seen from a front location), the movement of the paddles 184 (see FIG. 9) carries the debris upwardly, as indicated at 156 so that it tumbles down along the upper slanted surface of each of the paddles 84 to drop into the area defined by the center cone 96 and the upper paddles 84 to pass through the front opening 54 and onto the front discharge structure 64.

At the same time, the water flowing through the nozzles 132, 134 and 136 and into the drum chamber 44 not only raise the level of water into the drum above the level indicated at 138, but also urge the flow of water in a rearward direction to facilitate the movement of the floating material through the rear opening 52 and onto the rear discharge structure 56.

The high density fraction of the debris falls into the rotating rear discharge structure 64 is discharged onto the conveyor 22, and the water entrained in such higher density fractions falls between the bars 70 and into the receiving tank 72.

Figure 13:
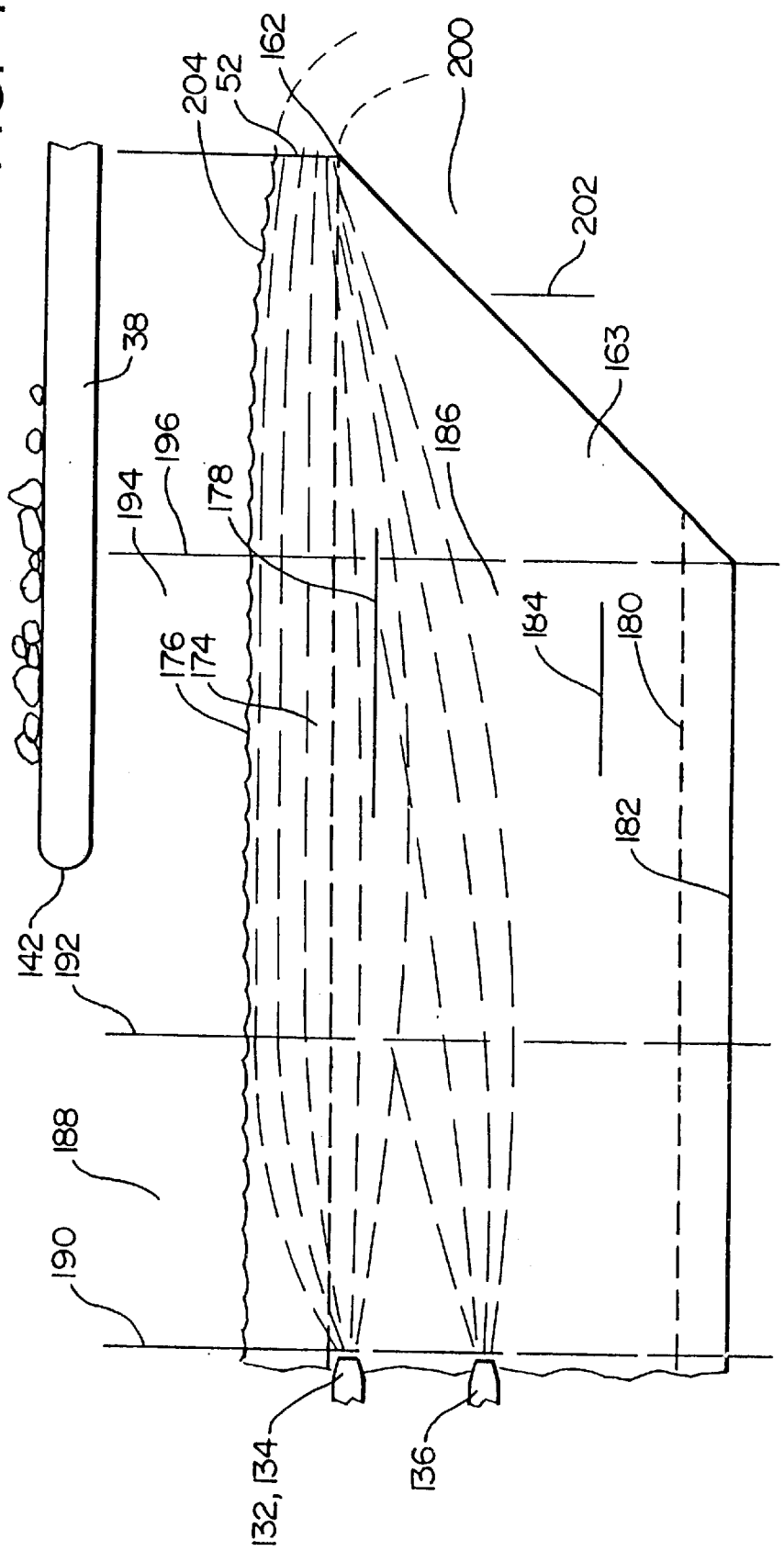
FIG. 13 is a sectional view taken along a vertical plane through the center axis of rotation of the apparatus, showing the lower portion of the separating drum and showing the flow pattern from the jets to the discharge opening.

As the lower density fraction of the construction debris exits through the opening 52, there is also a high volumetric flow rate through this opening 52. (The water level shown at 138 in FIG. 4 is shown as being somewhat lower than what it would be in full operation as shown in FIG. 13). The water falls through the spaces between the bars 62 of the rear discharge structure 56, and the rotating action of the rear structure 58 causes this lower density debris to be deposited onto the conveyor 24.

The arrangement of each of these discharge structures have several advantages. First, the water is effectively separated from the high and low density components to be collected in the tank 72 and recirculated back to the separating section 43. Second, with these discharge structures 56 and 64 being made part of the separating section 43 so as to be rotating during the separating process, the movement of both debris components to their respective conveyors is facilitated by the tumbling action imparted to the debris fractions.

d) More Detailed Description of the Sorting Out and Removal of the Low Density Fractions Earlier in this text, it was mentioned that the manner in which the discharge of the lower density debris through the opening 52 is accomplished is significant in the present invention. To explain this, reference will be made to FIGS. 10–13.

For convenience, in the following description the term "low density fraction of the debris" will simply be referred to as the "wood pieces", and the high density fraction of the debris will be referred to as the "rocks", since these two materials in a large number of instances comprise the preponderance of the construction debris. This is done with the understanding that the term "wood" would include other construction debris having low density that would be separated with the wood and the "rocks" include other high density debris.

Figure 10:
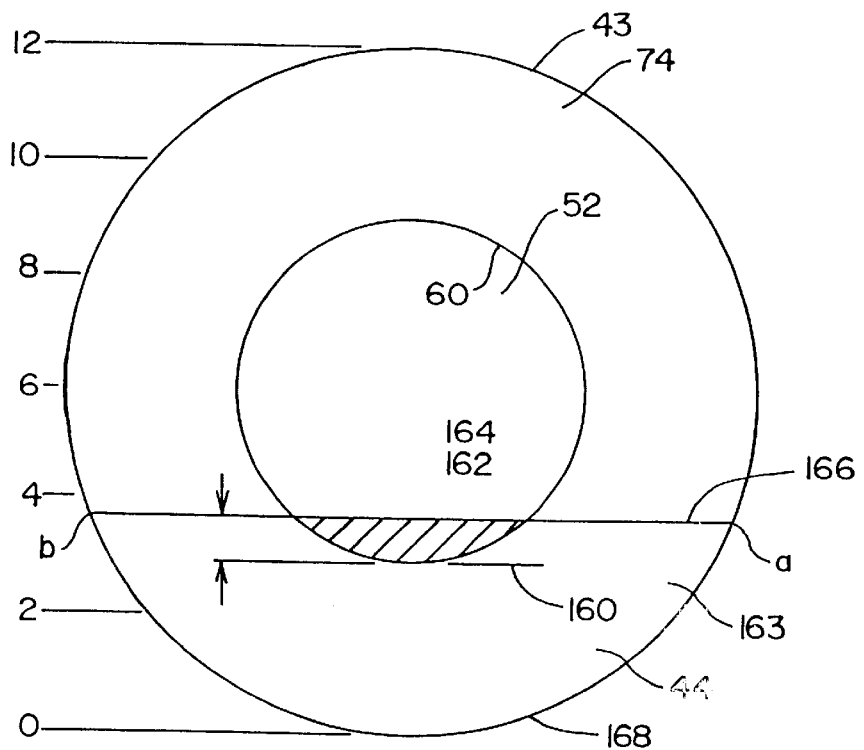
FIG. 10 is a schematic front elevational view of the separating and conveying drum of the present invention, illustrating the water level and the discharge pattern of the water through the rear end opening of the apparatus.
Figure 11:
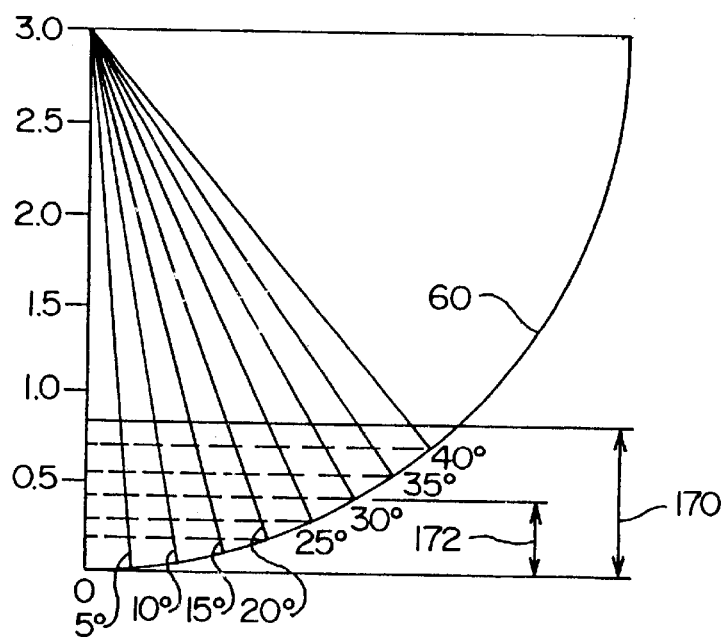
FIG. 11 is a schematic rear elevational view of the rear lower right hand segment of the rear discharge opening, showing the water level at different locations.

FIG. 10 is a semi-schematic rear elevational view looking toward the rear opening 52 through which the wood is discharged along with almost all of the water. In the preferred embodiment described herein, the diameter of the inner rear opening 52 defined by the perimeter edge 60 is six feet, while the diameter of the inside surface 106 of the drum 43 is twelve feet. If there is no flow of water in the drum, then as shown in FIG. 10 the water level would remain at the level 160 which is at the same height as the lowermost edge portion 162 of the rim 60. However, at such time as the separating assembly 20 is put into operation, and water is delivered into the processing chamber 44 in the drum 43 (the water being indicated at 163), then the water level is raised in the chamber 44 approximately to an operating level which in FIG. 10 is indicated at 164. (This can vary depending on the volumetric rate of the water flow into the chamber 44, the rate at which the debris is delivered, the size and shape of the wood items, etc.

Before getting into the details of the flow pattern of the water in the present invention, it is believed that it would be helpful to review some general principals regarding the hydrodynamics of water flow.

We begin by again looking at FIG. 10, and it can be seen that the lower area of the chamber 44 of the drum 43 that is filled with water during the operation of the machine, has a cross sectional configuration of a segment of a circle which is bound at the top part by the line 166 (at the water level 164) extending between the right and left point a and b, and also by the lower curved portion 168 of the lower portion of the wall of the drum 43. If the diameter of the drum is at twelve feet, then the cross sectional area of the area (i.e.

perpendicular to the longitudinal axis 50) of the drum in which the water is contained is calculated to be about 22 square feet. (This will vary depending on the level of the water at 166.

The cross sectional area of the water being discharged at 162 would be a very small fraction of this. To explain this, reference is made to FIG. 11 which shows only the right lower ninety degree portion of the rim 78 defining the rear discharge opening 52, and the arrow at 170 shows the level of the water when it extends up a little bit above the forty degree location as indicated on FIG. 11. When the water is at this level, the cross sectional area indicated 162 would be at 1.8 feet. On the other hand, if the water level is at the location indicated at 172 in FIG. 11 (i.e. the 30 degree location), that cross sectional area would be about 0.8 square feet. The volumetric flow rate is equal to the cross sectional area of the flow times the average velocity. If the height 164 increases, the pressure differential from the level 164 to the lowermost point 162 becomes greater (thus accelerating the flow to a greater higher velocity) and also the cross sectional area increases, so the volumetric flow rate of water increases substantially when the water level rises from the level at 172 to the level at 170.

Figure 12:
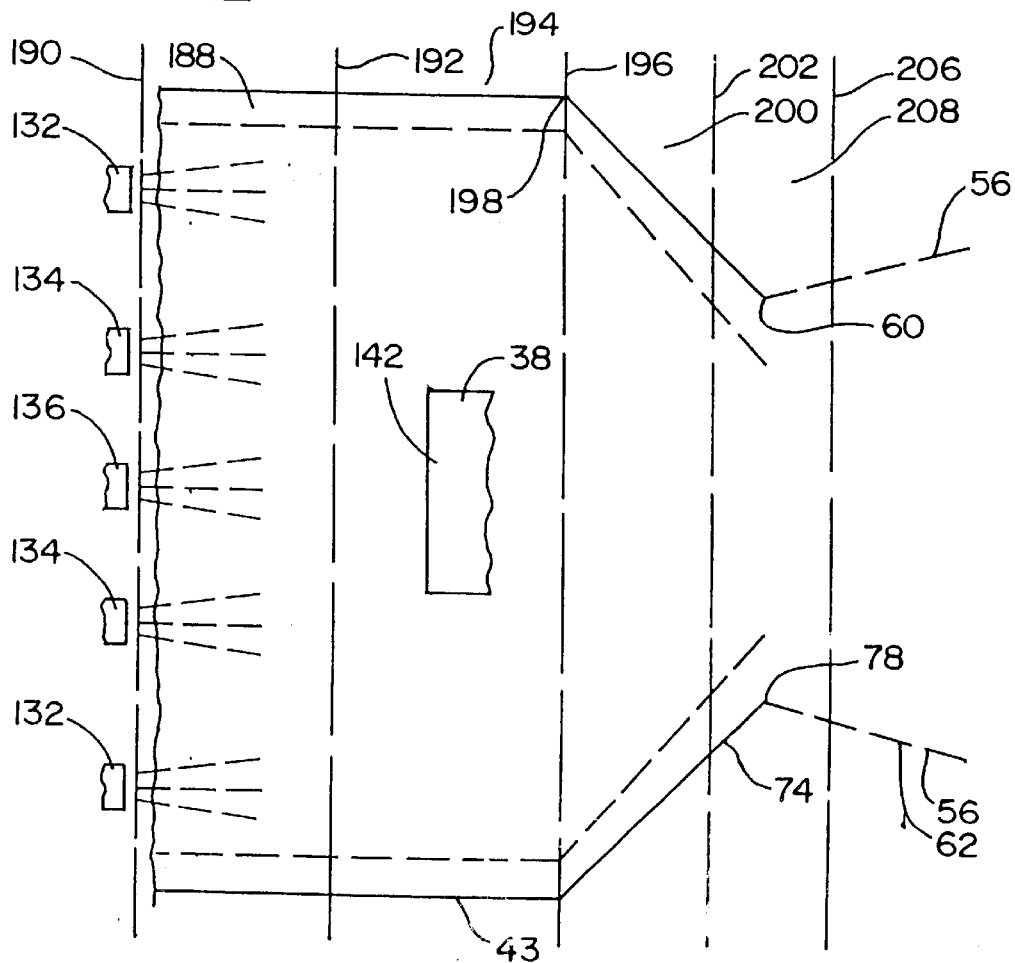
FIG. 12 is a schematic plan view taken along a horizontal plane extending through the center axis of rotation, and illustrating the flow pattern from the water discharge nozzles into the processing chamber.

To explore another facet of the hydrodynamics of fluid flow, reference is now made to FIG. 12. As indicated in FIG. 12, the inflow of water is through five nozzles, namely the four nozzles 132 and 134 which are closer to the level of the water, and also a single center nozzle 136 which is at a somewhat lower position. For the moment let us assume that the drum 43 is much longer, that these five nozzles are at a location much further upstream, and also that their discharge cross sectional areas are much larger so that the flow of the water has very little turbulence. With the cross sectional area of the drum 43 being uniform, while the water may experience some small eddy currents adjacent to the drum surface 43, for the most part it would be might be what called "quiescent". However, as the flow of water approaches the converging fursto-conical rear end wall 74 and the exit opening 52, for the same volumetric flow to go through this opening 52, it becomes necessary for the velocity of the water to increase substantially.

Some people have a mistaken notion that as water is flowing down an upwardly open channel and then reaches a narrowing restriction, the water will rise upwardly as it reaches the restriction so that the restricted portion can accommodate the flow of water. However, this does not happen. What does occur is that as the water approaches the constriction, the surface of the water actually becomes lower as the water enters into the restriction and is lowest at the narrowest point in the restriction. Then as it passes out of the restriction to a broader (greater area) channel, the level of the water rises.

In the preferred embodiment of the present invention described herein, the flow of water has a very high volumetric flow rate, a preferred range being two thousand gallons to two thousand five hundred gallons per minute or higher. On the assumption that there are 7.5 gallons of water for each cubic foot of water, and assuming that the volumetric flow during normal operation of the apparatus is two thousand to two thousand five hundred gallons per minute, then the volumetric flow rate through the separating section 32 is 4.4 to 5.5. cubic feet per second. If we are to assume that the level of the water in the containing area of the 12 foot drum is at approximately a level shown at FIG. 10, which would make this cross section area at least about twenty square feet, and if the flow were toward the exit opening 50 were undisturbed, then the average velocity of the water (assuming that the flow rate is about five cubic feet per second), would be calculated by dividing five cubic feet per second by twenty square feet which would give a velocity of about 0.25 feet per second. However, as the water would approach the constricted area defined by the fursto-conical rear end wall 74 in the opening 52, the flow path would be constricted, and the velocity would increase to a much higher level.

The above explanations are given as background information so that the operating principals of the present invention can be better understood. With the foregoing being given as background information, attention is now directed toward FIGS. 12 and 13 which show the drum 43 rear cone-shaped wall 74 and outlet opening 52 and the water jets 132, 134 and 136 somewhat schematically.

First with reference to FIG. 12, in the preferred embodiment of the present invention, the two water jets 134 have an elongate, horizontally aligned discharge opening having dimension of about 8 inches wide by two inches deep. The two outside water jets 132 have horizontally aligned openings about four inches wide and two inches deep. The center lower jet 136 has a horizontal opening about four inches wide and two inches deep. With the volumetric flow rate being about 4.4 to 5.5. cubic feet per second, and with the total cross sectional area of orifices of the five discharge jets 134–136 being approximately fifty six square inches (which is about 0.4 $Ft^2$), the velocity of the water flowing out of the jets on the average is about ten to fifteen feet per second. The jets 132 and 134 are oriented to discharge the water in a horizontal direction rearwardly, and the effect is to cause a relatively high velocity flow at the upper level of the water in the longitudinal central location. It can be seen in FIG. 12 that the discharge end 142 of the conveyor 38 is located about four feet rearwardly of the discharge location of the jets 132–136. As the wood pieces are falling off the conveyor 142 and entering into the water, these are engaged by the higher velocity water currents in the upper middle portion of the water and carried more rapidly toward the opening 52. The side jets 132 also cause a rearward flow of the upper level of the water along the edges in a rearward direction at about the same velocity as (or slightly lower than) the velocity at the center location.

The lower middle jet 136 also adds to the action of the jets 132 and 134, but adds an additional function. This jet 136 discharges rearwardly in a horizontal rearward direction (possibly with something of an upward slant) to engage some of the lower density material (e.g. water soaked wood) which may have a specific gravity very close to water or possibly even slightly greater than water. The water flow from the lower middle jet 136 tends to push such material rearwardly into the turbulent water at the upper level and helps to cause the discharge into the rear opening 52.

To further appreciate the novel features of the present invention, there should be a discussion of the boundary layer effect, sheer forces, laminar and turbulent flow and eddy currents. If the diameter of the tube or other conduit carrying the fluid is sufficiently large and the velocity sufficiently low, then there may be laminar flow where the "layers" aligned in the direction of flow stay intact. However, as the velocity increases, then the sheer forces between the layers moving relative to one another due to the boundary layer effect becomes sufficiently great so that the flow becomes turbulent. When this occurs, the slower fluid closer to the side surface tends to move inwardly to the main flow, and fluid portions in a more central location move outwardly. This results in eddy currents and other turbulent motion of the fluid.

In many of the prior art separating systems where the particles or objects are separated by flotation in accordance with their specific gravity, this turbulence is considered harmful since the currents may tend to mix the lighter and heavier particles. However, in the present invention, the flow patterns developed enhance the separation process and also increase the production of the system.

To explain this further, attention is now directed to FIG. 13 which is a longitudinal sectional view taken along a vertical center plane showing the flow over the lower rim portion 162 of the opening 52, and also showing generally the flow patterns developed by the jets 132, 134, and 136. For purposes of analysis and description, the body of water 163 can be considered as having three horizontal zones, namely an upper horizontal low density separation zone 174 extending between the upper water surface 176 and a level approximately one foot below the water at 178, and possibly only one half of a foot or as great as one and a half feet, depending on the location and other factors. Then there is a lower high density separation zone 180 which extends between a lowermost portion 182 of the drum's interior surface up to a level 184 that is about a half foot or a foot above the lower level at 182. Between the upper level 178 and the level 184 there is an intermediate zone 186 which could be termed the "quiescent zone".

Then there shall also be considered the upper transversely extending longitudinally spaced zone sections in the upper zone 174. With reference to FIGS. 12 and 13 there is a front high velocity discharge zone section 188 having a forward limiting plane 190 at the discharge location of the jets 132, 134 and 136 and a rear limiting plane 192 which is forwardly of the discharge end 142 of the conveyor 38 and rearward of the jet discharge locations at 190. In this zone section 188 the high velocity jets move into the water and establish an expanding turbulent flow pattern in the upper zone 174.

The next zone section 194 is called the sorting zone section, and this extends from the limiting plane 192 to a more rearward plane 196 which is approximately at the juncture location 198 where the rear edge 76 of the rear wall 74 joins to the drum 43. In this zone section 194 a sorting function is accomplished where the wood and the rock fall off the conveyor 142 and into the relatively high velocity and turbulent upper lower density separating zone 178. The rocks pass through the upper part of this zone 194 section in a rearward and downward path. The wood, on the other hand, will float in this zone section 194 and experience the turbulence of the flow as it moves rearwardly while still remaining in the upper zone 174.

Next, there is the predischarge zone section 200 that extends from the limit plane 196 to the next rear limit plane 202 which is a short distance forwardly of the rim 78 defining the opening 52. In this zone 200, the water flow is converging in an upward direction (see FIG. 13) and also being constricted laterally (see FIG. 12). This results in an increase in velocity, and the increase in velocity is also accompanied by a lowering of the water level at the upper surface, as indicated at 204 in FIG. 13 as the water approaches the end discharge location at the opening 52.

The final zone section is relatively short and can be seen to comprise the area from the limit plane 202 rearwardly to a location 206 a short distance forwardly of the rim 60 defining the opening 52, this zone section being designated 208. In this zone section 206, the wood passes outwardly through the opening 52 along with the water, with the wood being discharged by means of the end discharge structure 56, and the water flowing through the lengthwise opening between the bars 62 on the rear end discharge structure 56.

With the foregoing being given as background information, let us now review the overall operation of the separating section 32, as it relates to the flow of the water into and through the processing chamber 44. Let us assume further that the drum 43 has been filled with water to the level 138 which is at the level 162 of the lowermost portion of the opening 52. At this stage, the surface are of the water within the drum would be nearly fifty square feet. We will also assume that when the valve 144 is opened and the pump 146 is operating, about five cubic feet of water will be discharged through the nozzles 132, 134, and 136 at a volumetric rate of about five cubic feet per second. At that rate, the water within the processing chamber 44 would begin rising at the rate of about one inch per second. Thus, the timing of directing water through the nozzles 132–136 would begin at just about the same time as the conveyor 38, with the construction debris loaded thereon, would be starting to discharge the construction debris from the conveyor and into the water 163.

As the five streams of water are emitted from the water jets 132–136, each water jet is moving between 10–15 feet per second. As each water jet travels downstream, it expands somewhat vertically but due to the configuration of the nozzle discharge openings there is a greater expansion laterally. The "core" of the jet (i.e. the central portion of flow) is at a higher velocity, and the expansion area of the flow around that core of the water jet is at a lower velocity. As discussed previously about the general characteristics of hydrodynamic flow, this will be produced turbulence in the form of eddy currents and other turbulent motion. This occurs initially in the front high velocity discharge zone section 188 at the rearmost part of the upper low density separation zone 174.

The discharge location 142 of the conveyor 38 is, in this preferred embodiment, a little bit less than four feet rearwardly of the front discharge nozzles 132–136. Thus, when the construction debris (both wood and rocks) falls into the water, this will be at the location of the second upper zone section, namely the sorting zone 194. The construction debris (comprising both the rocks and the wood) encounter this somewhat turbulent flow of water in the upper zone 174 with an overall rearward movement that is concentrated in that upper zone 174. The rocks drop rather quickly through the zone 174, in a downward and rearward path of travel into the intermediate quiescent zone 186 and thence into the lower high density separation zone 180. The larger rocks drop more quickly, while the smaller rocks, having greater surface area relative to their mass, will drop at a lower velocity. Some of the smaller rocks, possibly with a larger surface area by virtue of being flat, may be carried somewhat further rearwardly, even to the location of the forward wall 74. However, there would be very little tendency for these rocks to climb upwardly along the sloping surface of the front wall 74. Thus substantially all of these will be carried by a spiral conveyor 104 forwardly to the front discharge area.

To further review the flow pattern, reference is made to FIG. 12, It can be seen that in addition to the water in the upper zone 174 having an overall rearward flow pattern, as the flow progresses rearwardly, the flow pattern also tends to converge toward the center, since it is influenced by the combined contours provided by the side portions of the drum wall 73 and the converging rear wall 74. Also, as can be seen in FIG. 13, about two to three feet rearwardly to the location where the construction debris is dropped in to the water, there is an upwardly converging flow pattern. It should also be noted that since this is a converging flow, the velocity will increase, and this increase will be roughly proportional to the decrease in the cross sectional area of the flow.

It will be recalled from the earlier part of this text in the discussion of the hydrodynamic principals, that when a body of water is flowing in an open channel and proceeds toward a constricted area that reduces the cross sectional flow area, not only will the velocity increase, but the top level of the water will also decrease as it moves into the converging flow area. In a sense, this water going into the converging area can be described as "going down hill".

With this in mind, let us again look at the water flow pattern into which the wood pieces and the rocks encounter in dropping off the end 142 of the conveyor 38 into the water. As indicated above, in initially contacting the water the rock fraction sinks relatively quickly and even if it is carried in the water rearwardly some distance, it ends up in the bottom part of the drum 43 and is carried by the spiral conveying structure 104 to the forward high density discharge location.

The wood immediately encounters the turbulent higher velocity water flow in the upper zone, with the water in the sorting section 194 being turbulent with eddy currents and other turbulent flow characteristics with an overall general rearward flow pattern. This results in a jostling of the wood pieces. It has been found that this has a beneficial effect and would help to knock unwanted debris, such as dirt, or possibly rocks adhering to the wood pieces away from the wood pieces. Then as soon as the wood pieces travel rearwardly for about two feet or so rearwardly from their location of entry into the water, they begin to experience an acceleration as the wood pieces approach the limit plane 198 and move into the predischarge zone section 200.

At this point let us examine another phenomenon of the flow pattern. If one were to look at the flow pattern at, for example, the limit plane indicated at 202, it would be found that the flow in the general area of the upper central segment of the water flow that is passing out the opening 152 would have a somewhat higher velocity than the water which is more closely adjacent to the lower perimeter portion of the opening 52. In general, the effect of this is that if there is a piece of wood which is aligned transversely (generally at a near right angle to the longitudinal axis 50), with the main upper middle portion of the flow having a greater velocity, there is a tendency for the piece of wood to "straighten out" relative to the axis 50 and become more in alignment with the axis 50. Further, let us assume that a piece of wood is still transversely aligned if it moves into the converging area. Since the central portion moves more rapidly, as the laterally outward portion of the wood piece (further away from the center axis 50) encounters the sloping side wall 74, the portion of the wood piece that is more centered would travel more rapidly and thus bring that piece of wood more into alignment with the longitudinal axis 50. Thus, the action of the water flow alleviates to a large extent the potential problem of blockages at the discharge opening 52.

However, let us assume that even considering the action of the water on the wood pieces as described above, a longer piece of wood does become jammed across the opening 52 with one end on one side of the opening 52 and the other end on the other side. In this situation, the force of the water flowing out the end opening end 52 would exert a force against the wood piece which would press it against the inner surfaces of the fursto-conical inwardly and upwardly sloping inner surface. As the separating section 43 rotates, the wood would tend to rotate with the fursto-conical wall 74 so that one end of the wood would be raised out of the water, and the other would be lowered in the water. As this continues to bring the piece of wood more to a vertical position, then the portion of the wood which is above the water would, by the force of gravity, tend to move it downwardly and thus tend to cause the lower end of the wood piece (being positioned against the surface underwater) to slide downwardly with the top end of the wood falling below the top edge of the opening 52 so that the wood piece is discharged.

It should be understood that the above comments are not intended to be a full and complete discussion of every possibility of the jamming of the wood pieces in the opening 52. However, it has been found that in general the action of the wood pieces do in most instances occur in accordance with the above description. It is also to be understood that even though the above explanation relative to the wood pieces exiting the opening 52 may be inaccurate in some respects, overall it has been found, that the possible jamming of the wood pieces (or other low density debris), has not become a problem.

A further benefit of the present invention relates to the action of the rear end discharge structure 56. First, this is highly beneficial in that it permits the effective recovery of the water in the tank 72 so that it can be reliably recirculated back into the system. Also, with the rotation of the end discharge structure 56, there is a tumbling action given to the wood and other low density pieces so that in case there is any jamming which is beginning to occur, the rotational movement carrying the wood pieces and causing them to drop generally alleviates this, and it has been found that the discharge and the low density debris can be achieved quite reliably.

It should also be understood that in the same benefits of the discharge action of the end structure 56 apply as well to the end structure 64 relative to the discharge of higher density debris.

Figure 14:
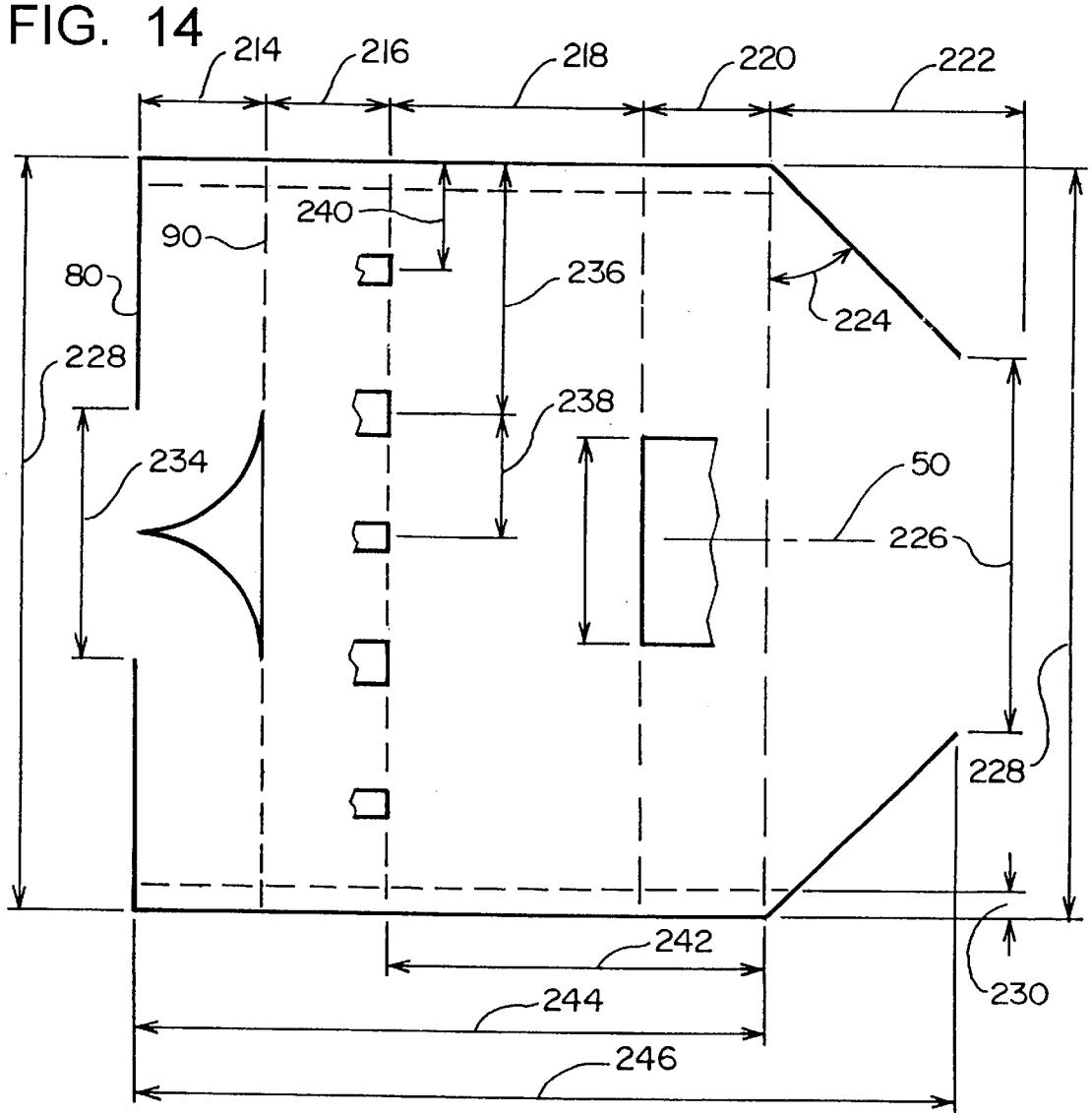
FIG. 14 is a sectional view similar to FIG. 12, but showing various dimensions and dimensional relationships of the separating drum of the present invention.

To describe the various dimensional and configuration relationships of the various components of the present invention, reference is now made to FIG. 14, which is a sectional view taken along a horizontal plane passing through the center axis 50. FIG. 14 is drawn to scale and shows the dimensions of a commercial embodiment of the present invention that has actually been constructed. The actual dimensions are as follows:

The width dimension of the paddles 84 taken from the rear wall 80 to the rear edge of the paddles 84, indicated at 214: two feet.

The distance of the exit plane of the nozzles 132, 134, and 136 forwardly of the rear edge of the paddles 84, indicated at 216: two feet.

The distance at the transverse plane at the discharge outlets of the nozzles 132, 134 and 136 to the discharge end 142 of the conveyor 38, indicated at 218: four feet.

The distance from the discharge end of the conveyor 38 to the forward edge of the drum side wall 73 where it meets the rear perimeter edge of the fursto-conical wall 74, indicated at 220: two feet.

The axial length of the fursto-conical end wall 74, indicated at 222: three feet.

The angle of slant of the fursto-conical end wall 74 relative to the transverse axis, indicated at 224: forty-five degrees.

The diameter of the rear end opening, indicated at 226: six feet.

The inside diameter of the drum 73, indicated at 228: twelve feet.

The width dimension (i.e. radially aligned dimension) of the spiral conveyor 106, indicated at 230: four inches.

The diameter of the forward opening 64, indicated at 234: four feet.

The distance of each of the nozzles 134 from the side wall of the drum 73, indicated at 236: four feet.

The distance of each of the nozzles 132 to a vertical center plane of the separating end conveying drum 43, indicated at 238: two feet.

The distance of each of the outer discharge jets 132 from the wall of the drum 73, indicated at 240: 1.75 feet.

The distance from the plane at the front edge of the nozzles 132–136 to the juncture point of the cylindrical side wall 73 to the tapering rear end wall 74 (which is the sum of the distances 218 and 200) indicated at 242: six feet.

The total dimension of the portion of the drum 73 from its rear end to the juncture of the end wall 74 with the cylinder wall 73, indicated at 244: ten feet.

The overall distance from the rear end of the separating and conveying drum 43 to the front edge of the end wall 74, indicated at 246: thirteen feet.

It is evident that these various dimensions given above can be scaled upwardly or downwardly, depending upon the type of debris being processed, and also the intended output of the apparatus. Further, it is evident that the relationships and ratios of the various dimensions could be changed. For example, it is evident that the dimension 216 could be made longer, but present analysis indicates that this would not provide any particular advantage. Also, the dimension 216 could be made shorter, and be much closer to the nozzles 132–136. The main limitation here is to provide space for the conduits that lead to these nozzles 132–136.

The dimension 214 which is the width of the paddles 84 could be greater, particularly if there are very large volumes and large pieces of the high density debris. The main criticality of this dimension is simply to be able to handle the output of the high density debris.

There are a number of dimensional relationships which affect the performance of the machine. One of these is the ratio of the rear end opening 52 to the overall diameter of the inside surface of the drum side wall 73. As shown herein, the diameter 226 is six feet, and the inside diameter of the side wall 83 twelve feet, which is a one to two ratio. The relative size of the opening 52 (dimension 226) could be greater, but the effect of this would be to make the water containing region of the chamber 44 shallower, and also narrower as the height of the body of water diminishes. Further, if the ratio approaches one to one, the depth of the water is so low that the separation of the debris cannot take place. On the other hand, if the ratio is made higher, such as one to three or one to four, then depending upon the overall dimensions of the drum 43 the volume of the water retained in the chamber 44 becomes unnecessarily large. Also, the exit opening 52, being smaller, would require a higher relative velocity to discharge an adequate amount of the low density debris. Present analysis indicates that the fifty percent ratio (i.e. one to two ratio of the diameter of the opening 52 to the diameter of the inside surface of the drum side wall 73) is satisfactory, and this could be increased to a certain extent in approximate five percent increments such as up to fifty five percent, sixty percent, seventy percent, or even up to seventy five percent. However, overall, going up toward the seventy five percent range and higher would provide a machine which is operable, but the design would not be optimized (based on present analysis).

Also, the angle 224 is shown to be at approximately at one half of a right angle. The angle could be greater, but of course as it approaches ninety degrees, the wall 74 simply becomes a cylinder. As this angle is increased, to maintain an adequate size of the diameter of the opening 42, the axial length of the side wall 74 must be made greater. While it would be possible to increase this angle up to as high as two thirds or three quarters of a right angle, or even up to five sixths of a right angle, it begins to unnecessarily elongate the machine without any real added benefit (based on present analysis). On the other hand when the angle is decreased to one third or one quarter of a right angle, the slant of the wall 74 becomes closer enough to being at right angles to the longitudinal axis 50, and impedes the action of the slanting wall 74 from properly directing the floating low density debris toward the outlet 52. It is believed that one third or two fifths of a right angle would be functional but might in some instance unnecessarily impede the proper discharge of the wood pieces.

As shown herein, the dimension shown at 218 (the distance from the discharge of the end of the nozzles 132–136 to the conveyor discharge end is about one third of the diameter of the drum cylindrical side wall 73. This ratio could be made higher (one quarter, one sixth, etc.), but there is the danger that some of the lower density material may react in the flow stream in a way that they may end up being in front of the nozzles 132–136. For example, some of the wood pieces could be falling just below a very larger boulder and be pushed downwardly so that these might travel beneath the zone 174 and forwardly to be behind the nozzles 132–136.

At the discharge location 142 indicated in FIG. 14, the flow from the jets 132–136 has broadened so that the overall movement of the water is such that the likelihood of this happening is substantially diminished, or for practical matter almost eliminated. On the other hand, to make this ratio lower, such as one to two, two to three or even as high as one to one, the jets 132–136 would be much further away from the debris receiving location. The apparatus would still be operable, but there would be no real increase in output, and in fact output may even be diminished since the velocity in the upper zone 174 may be diminished.

It was indicated earlier that the use of the higher velocity jets provide certain benefits not just in the separation, but also in the effective high volume discharge of the lower density material through the opening 52. In the preferred embodiment shown herein, the discharge velocity of the nozzles is between about ten to fifteen feet per second. This could be made lower, such as down to nine, eight, seven, six, five, four, three, two or even one foot per second. However, as the velocity would drop down to, for example, five feet per second or lower, some of the turbulent action of the water would be lost. Also, this would result in more of the flow being more evenly distributed throughout the entire mass of the water within the chamber 44, instead of it being more concentrated in the upper zone 174. The overall result would be that for the same volumetric water flow; the output of the separating drum 43 would likely be lower.

On the other hand, the velocity of the flow out of the nozzles 132–136 could be increased up to twenty, twenty five or thirty feet per second. But to achieve the same volumetric flow rate, it would be necessary to substantially increase the power input to the pump, and while the machine would be operable, present analysis indicates that the design would be less optimized.

With regard to the number and placement of the individual jets, it has been found that at least three jets (preferably five jets) creates jet streams of high velocity and yet have a sufficiently large cross sectional area of flow to create overall a turbulence that has larger eddy currents. If there is a very large number of individual jets discharging together, then at a short distance downstream these tend to simply coalesce into what might be termed a wall of water so that the desired turbulence and high velocity zones are not properly achieved. Accordingly, it is believed that there should be at least two jets, preferably three, four, five, six, seven, eight, nine or ten jets would be possible. However, when this begins reaching, possibly even up to fifteen or twenty individual jets, some of hydrodynamic benefit may be lost. Further, this would unnecessarily add to equipment costs, likely require a greater power to discharge though the smaller area jet opening, and (as indicated above) possibly diminish performance.

Further, it's obvious that various modifications could be made to the present invention without departing from the basic teachings thereof. For example, the use of the hopper 36 has been found to be a convenient way to deposit the construction debris onto the belt 38, and the use of a simple conveyor belt has found to be a quite adequate way of transmitting this debris into the chamber 44. But obviously there are other ways to move the material into a chamber, and these are to be considered to be within the scope of the present invention. However, these do provide certain benefits and contribute to the present invention, and thus contributes in certain aspects to the invention.

Further, the discharge section 82 has been shown as comprising a radially extending paddles 84. Within the broad scope, other discharge mechanisms could be used, such as a fursto-conical scroll type discharge container. However, this particular discharge mechanism as shown herein is particularly advantageous since it is a simple structure unitary with the overall drum 84, and it takes advantage of the rotation of the drum, without needing any other moving parts to perform its movement of the rocks to the discharge location.

With regard to the two discharge structures 56 and 64, theses are certainly significant in the present invention with regard to providing an effective, reliable and cost effective way of accomplishing the discharge and the separation of the water from the material being discharged. However within certain broader aspects of the present invention, as described herein, other devices for receiving the debris fractions and separating the debris from the water could be used, such as depositing the material from the end opening into a collector and then making the separation of the collection and separation of the water and the material at that location. However, the combination of the side wall 73 with the end walls 74 and 92, with the either or both of the discharge structures 56 and 70 certainly comprise an inventive combination.

It is to be recognized that various modifications could be made in both the method and apparatus without departing from its basic teachings.

I claim:

1. A method of separating debris where the debris comprises low density debris having a specific gravity less than water, and high density debris having a specific gravity greater than water, said method comprising:

a) providing a rotatably mounted drum which comprises a surrounding side wall and front and rear end walls having, respectively, front and rear discharge openings, said drum defining a processing chamber with a lower water containing chamber region, having an upper level at an upper water level in said region and a lower level at a lower side wall portion at said region, at least part of said water containing chamber region being positioned at a level below lower portions of said front and rear openings, said drum having a high density debris conveying structure which is arranged to engage high density debris in a lower part of said water containing chamber region;

b) filling the water containing chamber region with water to form a body of debris processing water in said chamber region;

c) delivering the debris to the processing chamber at a receiving location at said water containing chamber region;

d) delivering water into the processing chamber at a water discharge location forward of said debris receiving location at a location adjacent to the upper level of the water containing region in a rearward direction generally aligned with the upper level of the body of water at a sufficiently high velocity and at a portion of said water discharge location to create with surrounding water a turbulent downstream flow in an upper high velocity low density separating zone to move the low density debris in that zone from the debris receiving location rearwardly to be discharged at the rear discharge opening, with the high density debris being delivered to the receiving location descending through the upper high velocity low density separation zone toward the lower level of the water containing chamber region;

e) rotating the drum to cause the conveying structure to move the high density debris at the lower part of the water containing chamber region to a forward end of the drum and discharging the high density debris through the front opening.

2. The method as recited in claim 1, wherein the additional water is discharged at the water discharge region through a plurality of nozzles at locations at said water discharge region to form a plurality of water jets directed toward the debris receiving location.

3. The method as recited in claim 2, wherein said nozzles are positioned on both sides of a center location of said water discharge region.

4. The method as recited in claim 2, wherein there is at least one discharge nozzle at a location beneath said water discharge region to direct a flow of water in a rearward direction.

5. The method as recited in claim 2, wherein at least one of said nozzles has an elongate nozzle opening with a width dimension greater than its depth dimension, and with an elongate axis of each of said discharge openings being generally horizontally aligned.

6. The method as recited in claim 2, wherein the water is discharged through the nozzles at a velocity of at least one foot per second.

7. The method as recited in claim 6, wherein said velocity is at least four feet per second.

8. The method as recited in claim 6, wherein said velocity is at least about ten feet per second.

9. The method as recited in claim 1, wherein said rear discharge opening is defined by a generally circular perimeter rim and is generally centered on an axis of rotation of said drum, with water flowing out of said rear opening over a curved rim segment, said method further comprising delivering said additional water at a sufficient flow rate so that the curved segment over which the water flows is at least thirty degrees.

10. The method as recited in claim 9, wherein said curved segment is at least forty-five degrees.

11. The method as recited in claim 10, wherein said curved segment is at least sixty degrees.

12. The method as recited in claim 1, wherein said low density debris is moved by water flow from the debris receiving location into a pre-discharge zone section which is defined by an inwardly and rearwardly tapering rear end wall leading to the rear discharge opening and through which the water accelerates to be discharged through the rear discharge opening.

13. The method as recited in claim 12, wherein a rear edge portion of said rear end wall is aligned with a circular perimeter rim of said discharge opening, and said rear end wall is configured approximately in a frusto-conical configuration.

14. The method as recited in claim 13, wherein water and low density debris are discharged from the rear opening onto a low density debris receiving discharge structure having flow through openings through which the water falls to separate the low density debris from the water.

15. The method as recited in claim 1, wherein water and high density debris are discharged from the rear opening onto a high density debris receiving discharge structure having flow through openings through which the water falls to separate the high density debris from the water.

16. The method as recited in claim 15, wherein said high density debris receiving discharge structure comprises a surrounding frusto-conical side wall member with a smaller inlet opening and a larger outlet opening, which is rotated to tumble the low density debris to facilitate discharge of the same.

17. The method as recited in claim 1, wherein said high density debris is discharged by rotating a discharge structure to engage the high density debris at the forward end of the drum and carry such high density debris to be discharged through the front discharge opening.

18. The method as recited in claim 17, wherein said discharge structure is mounted to the drum and so as to be caused to rotate by rotation of the drum.

19. The method as recited in claim 18, wherein said discharge structure comprises a plurality of paddles which are circumferentially spaced and which engage the high density debris at a lower location to carry it to a higher location and cause discharge of the high density debris through the front discharge opening.

20. The method as recited in claim 1, wherein said high density conveying structure is positioned at an inside surface of said drum and extends radially inwardly therefrom with a rearward to forward slanting surface portions which engage the high density debris to cause forward movement of the high density debris.

21. A method of separating construction debris where the debris comprises a low density debris component made up at least in part of wood and having a specific gravity less than water, and a high density debris component made up at least in part of silica based material with a specific gravity greater than water, said method comprising:
   a) providing a rotatably mounted drum which comprises a surrounding side wall and front and rear end walls having, respectively, front and rear discharge openings, said drum defining a processing chamber with a lower water containing chamber region, having an upper level at an upper water level in said region and a lower level at a lower wall portion at said region, at least part of said water containing chamber region being positioned at a level below lower portions of said front and rear openings, said drum having a high density debris conveying structure which is arranged to engage high density debris in a lower part of said water containing chamber region;
   b) filling the water containing chamber region with water to form a body of debris processing water in said chamber region;
   c) delivering the debris to a receiving location in the processing chamber at a receiving location at said water containing chamber region;
   d) delivering additional water into the processing chamber at a water discharge location forward of said debris receiving location, with said additional water being delivered at a sufficiently high volumetric rate to create a water flow at a sufficiently high velocity to create turbulent flow to move low density from the debris receiving location rearwardly be discharged at the rear discharge opening, with the high density debris of the debris being delivered to the receiving location descending toward the lower level of the water containing chamber region;
   e) rotating the drum to cause the conveying structure to move the high density debris at the lower part of the water containing chamber region to a forward end of the drum and discharging the high density debris through the front opening.

22. The method as recited in claim 21, wherein there is performed a preliminary separation operation where smaller size construction debris below a predetermined size range, and larger debris having pieces larger than a given larger size limit are separated from the construction debris to isolate a middle sized construction debris fraction, and the middle sized debris fraction is directed to the drum.

23. An apparatus for separating debris where the debris comprises a low density component having a specific gravity less than water, and a high density degree component having a specific gravity greater than water, said apparatus comprising:
   a) a rotatably mounted drum which comprises a surrounding side wall and front and rear end walls having, respectively, front and rear discharge openings, said drum defining a processing chamber having a lower water containing chamber region, arranged to contain water with an upper level at an upper water level in said region and a lower level at a lower side wall portion at said region, at least part of said water containing chamber region being positioned at a level below lower portions of said front and rear openings, said drum having a high density debris conveying structure which is arranged to engage high density debris in a lower part of said water containing chamber region;
   b) a debris delivering section to deliver debris into the processing chamber at a receiving location at said water containing chamber region;
   c) a water supply and delivery section, arranged to deliver water to the water containing chamber region to form a body of debris processing water in said chamber region, said water supply and delivery section having a nozzle section having a nozzle discharge portion which is sized and oriented to deliver water into the processing chamber at only a portion of a water discharge location forward of said debris receiving location, at a sufficiently high velocity to create with surrounding water a turbulent rearward flow to move the low density debris in that zone from the debris receiving location rearwardly, in a manner that the high density debris of the debris is delivered to the receiving location descending through the upper high velocity low density separation zone toward the lower level of the water containing chamber region;
   d) a support and drive section to support and rotate the drum;
   e) a high density discharge section to discharge the high density debris through the front opening;

whereby rotation the drum causes the conveying structure to move the high density debris at the lower part of the water containing chamber region to a forward end of the drum where the high density debris is discharged through the front opening, and the low density debris is discharged with water through the rear opening.

24. The apparatus as recited in claim 23, wherein there is a water discharge region at the water discharge location extending across the upper level of the water containing chamber region, said nozzle discharge portion being positioned to discharge water in a downstream direction into said water discharge region so that the additional water creates with the surrounding water a turbulent downstream flow in said water discharge region.

25. The apparatus as recited in claim 24, wherein the nozzle discharge portion comprises a plurality of nozzles at locations at said water discharge region to form a plurality of water jets directed toward the debris receiving location and to create turbulence in surrounding water.

26. The apparatus as recited in claim 25, wherein said nozzles are positioned on both sides of a center location of said water discharge region.

27. The apparatus as recited in claim 25, wherein there is at least one discharge nozzle at a location beneath said water discharge region to direct a flow of water in a rearward direction.

28. The apparatus as recited in claim 25, wherein each of said nozzles has an elongate nozzle opening with a width dimension greater than its depth dimension, and with an elongate axis of each of said discharge openings being generally horizontally aligned.

29. The apparatus as recited in claim 25, wherein said water supply and delivery section has a capacity relative to nozzles so that the water is able to be discharged through the nozzles at a velocity of at least one foot per second to create turbulence in surrounding water.

30. The apparatus as recited in claim 29, wherein said velocity is at least four feet per second.

31. The apparatus as recited in claim 29, wherein said velocity is at least about ten feet per second.

32. The apparatus as recited in claim 23, wherein said rear discharge opening is defined by a generally circular rim and is generally centered on an axis of rotation of said drum, with the water flowing out of said rear opening over a curved rim segment, said water supply and delivery section having capacity relative to size of said rear discharge opening to be able to deliver a sufficient flow rate so that the curved segment over which the water flows is at least thirty degrees.

33. The apparatus as recited in claim 32, wherein said curved segment is at least forty-five degrees.

34. The apparatus as recited in claim 33, wherein said curved segment is at least sixty degrees.

35. The apparatus as recited in claim 32, wherein said rear end wall is an inwardly and rearwardly tapering rear end wall leading to the rear discharge opening and through which the water accelerates to be discharged through the rear discharge opening.

36. The apparatus as recited in claim 35, wherein a rear edge portion of said rear end wall is aligned with the circular perimeter rim of said discharge opening, and said rear end wall is configured approximately in a frusto-conical configuration.

37. The apparatus as recited in claim 35, wherein there is a low density debris receiving discharge structure onto which water and low density debris is discharged, and which has flow through openings through which the water falls to separate the low density debris from the water.

38. The apparatus as recited in claim 37, wherein said low density debris receiving discharge structure which comprises a surrounding frusto-conical side wall member with a smaller inlet opening and a larger outlet opening, and which is rotated to tumble the low density debris to facilitate discharge of the same.

39. The apparatus as recited in claim 38, wherein there is at said rear opening low density debris receiving discharge structure onto which water and low density debris is discharged, and which has flow through openings through which the water falls to separate the low density debris from the water said low density debris receiving discharge structure connected to said drum so as to be rotatable therewith.

40. The apparatus as recited in claim 23, wherein there is a high density debris receiving discharge structure having a surrounding wall onto which water and low density debris are discharged, which wall has flow through openings through which the water falls to separate the low density debris from the water, and which is connected to said drum so as to be rotatable therewith.

41. The apparatus as recited in claim 40, wherein said high density debris receiving discharge structure comprises a surrounding frusto-conical side wall member with a smaller inlet opening and a larger outlet opening, and which is rotated to tumble the low density debris to facilitate discharge of the same.

42. The apparatus as recited in claim 23, wherein said high density debris is discharged by rotating a discharge structure to engage the debris at the forward end of the drum and carry such high density debris to be discharged through the front discharge opening.

43. The apparatus as recited in claim 42, wherein said discharge structure is mounted to the drum and so as to be caused to rotate by rotation of the drum.

44. The apparatus as recited in claim 42, wherein said discharge structure comprises a plurality of paddles which are circumferentially spaced and which engage the high density debris at a lower location to carry it to a higher location and cause discharge of the high density debris through the front discharge opening.

45. The apparatus as recited in claim 23, wherein said low density conveying structure is positioned at an inside surface of said drum and extends radially inwardly therefrom with a rearward to forward slanting surface portions which engage the high density debris to cause forward movement of the high density debris.

46. A method of separating debris where the debris comprises low-density debris having a specific gravity less than water, and high-density debris having a specific gravity greater than water, said method comprising:

a) providing a rotatably mounted drum which comprises a surrounding side wall and front and rear end walls having respectively, front and rear discharge openings, said drum defining a processing chamber with a lower water-containing chamber region, having an upper level at an upper water level in said region and a lower level at a lower side wall portion at said region, at least part of said water containing chamber region being positioned at a level below lower portions of said front and rear openings, said drum having a high-density debris-conveying structure which is arranged to engage high-density debris in a lower part of said water-containing chamber region;

b) filling the water-containing chamber region with water to form a body of debris processing water in said chamber region;

c) delivering the debris to the processing chamber at a receiving location at said water containing chamber region;

d) delivering additional water into the processing chamber at a water discharge location forward of said debris-receiving location, with said additional water being delivered at a location adjacent to the upper level of the water-containing region in a rearward direction generally aligned with the upper level of the body of water at a sufficiently high velocity into an upper high-velocity low-density separating zone to move the low-density debris in that zone from the debris-receiving location rearwardly to be discharged at the rear discharge opening, with the high-density debris being delivered to the receiving location descending through the upper high-velocity low-density separation zone toward the lower level of the water-containing chamber region;

e) rotating the drum to cause the conveying structure to move the high-density debris at the lower part of the water-containing chamber region to a forward end of the drum and discharging the high-density debris through the front opening;

f) said method being further characterized in that said rear discharge opening is defined by a generally circular perimeter rim which is generally centered on an axis of rotation of said drum, with water flowing out of said rear opening over a curved rim segment, said method further comprising discharging the water and low-density debris being discharged from the rear opening onto a low-density debris-receiving discharge structure having flow through openings through which the water falls to separate the low-density debris from the water, with said low-density debris receiving discharge structure comprising a surrounding side wall member with a smaller inlet opening and a larger outlet opening, which is rotated to tumble the low-density debris to facilitate discharge of the same.

47. The method as recited in claim 46, wherein said low-density debris receiving and discharge structure is connected to said drum so as to be rotatable therewith.

48. A method of separating construction debris where the debris comprises a low-density debris component made up at least in part of wood and having a specific gravity less than water, and a high-density debris component made up at least in part of silica-based material with a specific gravity greater than water, said method comprising:

a) providing a rotatably mounted drum which comprises a surrounding side wall and front and rear end walls having, respectively, front and rear discharge openings, with said rear discharge opening being defined by a generally circular perimeter rim generally centered on an axis of rotation of said drum, said drum defining a processing chamber with a lower water-containing chamber region, having an upper level at an upper water level in said region, at least part of said water-containing chamber region being positioned at a level below lower portions of said front and rear openings, said drum having a high-density debris-conveying structure which is arranged to engage high-density debris in a lower part of said water-containing chamber region;

b) filling the water-containing chamber region with water to form a body of debris-processing water in said chamber region;

c) delivering the debris to a receiving location in the processing chamber at a receiving location at said water-containing chamber region;

d) delivering water into the processing chamber at a water discharge location forward of said debris-receiving location, with said additional water being delivered at a sufficiently high volumetric rate to create a water flow at a sufficiently high velocity at least at an upper zone of said water-containing region so that the water flows over a curved perimeter rim segment which is at least thirty degrees in length to move low-density debris from the debris-receiving location rearwardly to be discharged at the rear discharge opening, with the high-density debris of the debris being delivered to the receiving location descending through the upper high-velocity low-density separation zone toward the lower level of the water-containing chamber region;

e) rotating the drum to cause the conveying structure to move the high-density debris at the lower part of the water-containing chamber region to a forward end of the drum and discharging the high-density debris through the front opening.

49. The method as recited in claim 48, wherein there is performed a preliminary separation operation where smaller-sized construction debris below a predetermined size range, and larger debris having pieces larger than a given larger size limit are separated from the construction debris to isolate a middle-sized construction debris fraction, and the middle-sized fraction is directed to the drum.

50. The method as recited in claim 49, wherein water and high-density debris are discharged from the front opening onto a rotating high-density debris-receiving discharge structure having flow through openings through which the water falls to separate the high-density debris from the water.

51. The method as recited in claim 50, wherein said high-density debris-receiving discharge structure comprises a surrounding side wall member extending between a smaller inlet opening and a larger outlet opening, which is rotated to tumble the low-density debris to facilitate discharge of the same.

52. The method as recited in claim 51, wherein said high-density debris-receiving discharge structure is connected to said drum so as to be rotatable therewith.

53. The method as recited in claim 48, wherein said curved segment is at least forty-five degrees.

54. The method as recited in claim 53, wherein said curved segment is at least sixty degrees.

55. The method as recited in claim 48, wherein said low-density debris is moved by water flow from the debris-receiving location into a predischarge zone section which is defined by an inwardly and rearwardly tapering rear end wall leading to the rear discharge opening and through which the water accelerates to be discharged through the rear discharge opening.

56. The method as recited in claim 55, wherein a rear edge portion of said rear end wall is aligned with the circular perimeter rim of said discharge opening, and said rear end wall is configured approximately in a frusto-conical configuration.

57. A method of separating construction debris where the debris comprises a low-density debris component made up at least in part of wood and having a specific gravity less than water, and a high-density debris component made up at least in part of silica-based material with a specific gravity greater than water, said method comprising:

a) proving a rotatably mounted drum which comprises a surrounding side wall and front and rear end walls having, respectively, front and rear discharge openings, said drum defining a processing chamber with a lower water-containing chamber region, at least part of said water-containing chamber region being positioned at a level below lower portions of said front and rear openings, said drum having a high-density debris-conveying structure which is arranged to engage high-density debris in a lower part of said water-containing chamber region;

b) filling the water-containing chamber region with water to form a body of debris-processing water in said chamber region;

c) delivering the debris to a receiving location in the processing chamber at a receiving location at said water-containing chamber region;

d) delivering water into the processing chamber at a water discharge location forward of said debris-receiving location, with said water being delivered at a sufficiently high volumetric rate to create a water flow at a sufficiently high velocity at least at an upper zone of said water-containing region to move low-density debris in that zone from the debris-receiving location rearwardly to be discharged at the rear discharge opening, with the high-density debris of the debris being delivered to the receiving location descending through the upper high-velocity low-density separation zone toward the lower level of the water-containing chamber region;

e) rotating the drum to cause the conveying structure to move the high-density debris at the lower part of the water-containing chamber region to a forward end of the drum and discharging the high-density debris through the front opening;

f) said method being characterized in that water and low-density debris are discharged from the rear opening onto a rotating low-density debris-receiving discharge structure having flow through openings through which the water falls to separate the low-density debris from the water.

58. The method as recited in claim 57, wherein said low-density debris-receiving discharge structure comprises a surrounding side wall member with a smaller inlet opening and a larger outlet opening, which is rotated to tumble the low-density debris to facilitate discharge of the same.

59. The method as recited in claim 57, wherein said low-density debris receiving and discharge structure is connected to said drum so as to be rotatable therewith.

60. A method of separating debris where the debris comprises a low-density debris component having a specific gravity less than water, and a high-density debris component with a specific gravity greater than water, said method comprising:

a) providing a rotatably mounted drum which comprises a surrounding side wall and front and rear end walls having, respectively, front and rear discharge openings, said drum defining a processing chamber with a lower water-containing chamber region, having an upper level in said region at least part of said water-containing chamber region being positioned at a level below lower portions of said front and rear openings, said drum having a high-density debris-conveying structure which is arranged to engage high-density debris in a lower part of said water-containing chamber region;

b) filling the water-containing chamber region with water to form a body of debris-processing water in said chamber region;

c) delivering the debris to a receiving location in the processing chamber at a receiving location at said water-containing chamber region;

d) delivering water into the processing chamber through a nozzle section at a water discharge location forward of said debris-receiving location, with said additional water being discharged at a velocity at least or about one foot per second in at least at an upper zone of said water-containing region to create a turbulent flow to move low-density debris in that upper zone from the debris-receiving location rearwardly to be discharged at the rear discharge opening, with the high-density debris of the debris being delivered to the receiving location descending through the upper high-velocity low-density separation zone toward the lower level of the water-containing chamber region;

e) rotating the drum to cause the conveying structure to move the high-density debris at the lower part of the water-containing chamber region to a forward end of the drum and discharging the high-density debris through the front opening.

61. The method as recited in claim 60, wherein said velocity is at least as great as four feet per second.

62. The method of claim 61, wherein said velocity is at least about ten feet per second.

63. A method of separating construction debris where the debris comprises a low-density debris component made up at least in part of wood and having a specific gravity less than water, and a high-density debris component made up at least in part of silica-based material with a specific gravity greater than water, said method comprising:

a) performing a first separating operation on said construction debris to separate said construction debris into a first larger-sized fraction which is made up of pieces of larger-sized material having a maximum dimension above a predetermined size range, and a smaller-sized fraction made up of smaller pieces of material having a size at or below said separation range;

b) directing the smaller-sized fraction to a separating assembly at which the smaller-sized fraction is separated into a low-density fraction made up at least in part of wood and having a specific gravity less than water, and a high-density fraction made up at least in part in silica-based material with a specific gravity greater than water, said separating being accomplished as follows:

i) providing a rotatably mounted drum which comprises a surrounding side wall and front and rear end walls having, respectively, front and rear discharge openings, said drum defining a processing chamber with a lower water-containing chamber region, having an upper level at an upper water level in said region, at least part of said water-containing chamber region being positioned at a level below lower portions of said front and rear openings, said drum having a high-density debris-conveying structure which is arranged to engage high-density debris in a lower part of said water-containing chamber region;

ii) filling the water-containing chamber region with water to form a body of debris-processing water in said chamber region;

iii) delivering the debris to a receiving location forward of said debris receiving location at said water-containing chamber region;

iv) delivering water into the processing chamber at a water discharge location forward of said debris-receiving location, in a manner to create turbulent flow to move low-density debris from the debris-receiving location rearwardly to be discharged at the rear discharge opening, with the high-density debris of the debris being delivered to the receiving location descending toward the lower level of the water-containing chamber region;

v) rotating the drum to cause conveying structure to move the high-density debris at the lower part of the water-containing chamber region to a forward end of the drum and discharging the high-density debris through the front opening.

64. The method as recited in claim 63, wherein prior to said separating the construction debris into a larger fraction and a smaller fraction, the construction debris is subjected to a separation step where a very small-sized piece fraction is separated from the construction debris, so that the smaller-sized fraction delivered to the separating assembly has a substantial part of a maximum dimension at a level greater than said very small-sized fraction and said larger-sized fraction.

65. A method of separating debris where the debris comprises a low-density debris component made up at least in part of wood and having a specific gravity less than water, and a high-density debris component made up at least in part of silica-based material with a specific gravity greater than water, said method comprising:

a) providing a rotatably mounted drum which comprises a surrounding side wall and front and rear end walls having, respectively, front and rear discharge openings, said drum defining a processing chamber with a lower water-containing chamber region, at least part of said water-containing chamber region being positioned at a level below lower portions of said front and rear openings, said drum having a high-density debris-conveying structure which is arranged to engage high-density debris in a lower part of said water-containing chamber region;

b) filling the water-containing chamber region with water to form a body of debris processing water in said chamber region;

c) delivering the debris to a receiving location in the processing chamber at a receiving location at said water containing chamber region;

d) delivering water into the processing chamber at a water discharge location forward of said debris-receiving location in a manner to cause a turbulent flow of water toward the debris receiving location to cause the low-density debris to move rearwardly be discharged at the rear discharge opening, with the high-density debris being delivered to the receiving location descending through the upper high-velocity low-density separation zone toward the lower level of the water-containing chamber region to a forward end of the drum and discharging the high-density debris through the front opening.

66. The method as recited in claim 65, whereby said water is discharged at the water discharge location through a nozzle section at a velocity of at least one foot per second.

67. The method as recited in claim 66, wherein said velocity is at least four feet per second.

68. The method as recited in claim 66, wherein said velocity is at least as great as about ten feet per second.

* * * * *